(12) United States Patent
Kim et al.

(10) Patent No.: US 12,027,942 B2
(45) Date of Patent: Jul. 2, 2024

(54) ELECTRIC MOTOR ASSEMBLY AND HAIR DRYER HAVING THE SAME

(71) Applicant: LG Electronics Inc., Seoul (KR)

(72) Inventors: Jaeho Kim, Seoul (KR); Sunghyun Kim, Seoul (KR); Kyungho Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 808 days.

(21) Appl. No.: 17/130,837

(22) Filed: Dec. 22, 2020

(65) Prior Publication Data

US 2021/0344249 A1 Nov. 4, 2021

(30) Foreign Application Priority Data

Apr. 29, 2020 (KR) .................. 10-2020-0052473

(51) Int. Cl.
*H02K 5/173* (2006.01)
*A45D 20/12* (2006.01)
(Continued)

(52) U.S. Cl.
CPC .......... *H02K 5/1732* (2013.01); *A45D 20/12* (2013.01); *H02K 7/083* (2013.01); *H02K 7/14* (2013.01);
(Continued)

(58) Field of Classification Search
CPC ........ H02K 5/1732; H02K 7/083; H02K 7/14; H02K 11/30; H02K 21/14; H02K 2211/03;
(Continued)

(56) References Cited

U.S. PATENT DOCUMENTS

| 7,265,468 B1 * | 9/2007 | Mancl ............... H02K 5/10 310/90 |
| 2013/0111777 A1 | 5/2013 | Jeong |

(Continued)

FOREIGN PATENT DOCUMENTS

| CN | 109286260 | 1/2019 |
| CN | 109842231 | 6/2019 |

(Continued)

OTHER PUBLICATIONS

Notice of Allowance in Korean Appln. No. 10-2020-0052473, dated Nov. 8, 2021, 7 pages (with English translation).
(Continued)

*Primary Examiner* — Amy J. Sterling
(74) *Attorney, Agent, or Firm* — Fish & Richardson P.C.

(57) ABSTRACT

An electric motor assembly includes an outer housing, an impeller rotatably disposed in the outer housing, an inner housing that is disposed in the outer housing and defines an air flow path at an outside of the inner housing, a stator disposed in the inner housing, a rotor disposed in the inner housing, the rotor comprising a rotating shaft coupled to the impeller, a first bearing that is disposed in the inner housing and supports a first side of the rotating shaft, a second bearing that disposed in the inner housing and supports a second side of the rotating shaft, and a bracket that is disposed at the second bearing and that is in contact with an end of the stator. The bracket is coupled to the inner housing in an axial direction of the inner housing.

20 Claims, 25 Drawing Sheets

(51) Int. Cl.
H02K 7/08 (2006.01)
H02K 7/14 (2006.01)
H02K 11/30 (2016.01)
H02K 21/14 (2006.01)

(52) U.S. Cl.
CPC ............. H02K 11/30 (2016.01); H02K 21/14 (2013.01); H02K 2211/03 (2013.01)

(58) Field of Classification Search
CPC ........ H02K 1/146; H02K 1/185; H02K 11/33; H02K 21/16; H02K 5/161; H02K 1/14; H02K 3/345; H02K 3/50; H02K 5/04; H02K 5/1672; H02K 11/0094; H02K 5/16; H02K 1/16; H02K 1/2706; H02K 7/003; H02K 15/10; A45D 20/12; A45D 20/10; F04D 25/08; F04D 29/582
See application file for complete search history.

(56) References Cited

U.S. PATENT DOCUMENTS

| | | | |
|---|---|---|---|
| 2017/0170709 A1 | 6/2017 | Simeon et al. | |
| 2018/0076683 A1* | 3/2018 | Hwang | H02K 5/207 |
| 2018/0076684 A1* | 3/2018 | Hwang | A47L 9/0081 |
| 2020/0099276 A1* | 3/2020 | Mancl | H01R 39/381 |
| 2021/0288549 A1* | 9/2021 | Kim | H02K 11/33 |
| 2021/0344250 A1* | 11/2021 | Kim | H02K 11/33 |
| 2022/0069665 A1* | 3/2022 | Noh | H02K 9/04 |

FOREIGN PATENT DOCUMENTS

| | | |
|---|---|---|
| JP | 2019024276 | 2/2019 |
| JP | 2019103168 | 6/2019 |
| KR | 1020120085007 | 7/2012 |
| KR | 200486315 | 5/2018 |
| KR | 20180065621 | 6/2018 |
| KR | 20190127044 | 11/2019 |
| KR | 1020190127044 | 11/2019 |
| WO | WO 2018179833 | 10/2018 |

OTHER PUBLICATIONS

Office Action in Korean Appln. No. 10-2020-0052473, dated Jul. 12, 2021, 12 pages (with English translation).

Office Action in Chinese Appln. No. 202010933737.4, dated Mar. 22, 2023, 32 pages(with English translation).

* cited by examiner

ELECTRIC MOTOR ASSEMBLY AND HAIR DRYER HAVING THE SAME

CROSS-REFERENCE TO RELATED APPLICATION

Pursuant to 35 U.S.C. § 119(a), this application claims the benefit of the earlier filing date and the right of priority to Korean Patent Application No. 10-2020-0052473, filed on Apr. 29, 2020, the contents of which are incorporated by reference herein in their entirety.

TECHNICAL FIELD

The present disclosure relates to an electric motor assembly, and a hair dryer having the same.

BACKGROUND

An electric motor is an apparatus that can convert electric energy into mechanical energy. For example, electric motors may include a stator and a rotor configured to rotate with respect to the stator.

The electric motors may be manufactured in various sizes and weights depending on the purpose of use.

For instance, the size and weight of the electric motors may be reduced to be used in a "handheld appliance" or a "handheld device" (hereinafter, "handheld device") that can be held and used in one or both hands.

In some cases, the electric motor can be used in a handheld device such as a hair dryer and/or a vacuum cleaner, and configured as an electric motor assembly having an impeller.

As for the electric motor assembly used in the handheld device, its size and weight reduction may be related to convenience of use, and a high-speed operation of the electric motor assembly may maintain the same air flow (volume) and/or air velocity.

In some cases, an electric motor assembly in a handheld device may include a stator and a rotor that are relatively small in size, which may decrease a coupling force. Thus, it may be difficult to securely maintain initial alignment of shaft lines.

In some cases, it may be difficult to support a bearing that rotatably supports a rotating shaft of the rotor, and a lateral displacement of the rotating shaft may increase. As a result, abrasion or wear of the bearing may be accelerated, and a lifespan of the bearing may be reduced.

In some cases, where the electric motor assembly has a pair of frames that accommodate the stator and the rotor therein and are coupled face to face to be fastened by a bolt, the size of the pair of frames may be increased compared to the stator size, thereby increasing an external size of the electric motor. An increase of the size of the pair of frames may result in an increase of the weight of the electric motor.

In some examples, where the sizes of the pair of frames, the stator, and the rotor are reduced, a motor output may be decreased.

In some cases, an electric motor assembly of a handheld device may include two bearings that are accommodated in a housing and spaced apart from each other, an impeller that is disposed at one side of the bearing, and a rotor supported by another side of the bearing. In this case, the electric motor assembly may not be suitable for reducing a lateral displacement of a rotating shaft, and the number of rotations of the electric motor assembly may be limited.

SUMMARY

The present disclosure describes an electric motor assembly that can reduce the weight by reducing a bracket in size and reducing flow resistance of air moved by an impeller, and a hair dryer having the same.

The present disclosure also describes an electric motor assembly that can suppress a lateral displacement of a rotor by supporting both sides of the rotor, and a hair dryer having the same.

The present disclosure also describes an electric motor assembly that can reduce the sizes of a stator and a rotor and enables a high-speed rotation, and a hair dryer having the same.

According to one aspect of the subject matter described in this application, an electric motor assembly includes an outer housing, an impeller rotatably disposed in the outer housing, an inner housing that is disposed in the outer housing and defines an air flow path at an outside of the inner housing, a stator disposed in the inner housing, a rotor disposed in the inner housing, the rotor comprising a rotating shaft coupled to the impeller, a first bearing that is disposed in the inner housing and supports a first side of the rotating shaft, a second bearing that disposed in the inner housing and supports a second side of the rotating shaft, where the rotor is disposed between the first bearing and the second bearing, and a bracket that is disposed at the second bearing and that is in contact with an end of the stator. The bracket is coupled to the inner housing in an axial direction of the inner housing.

Implementations according to this aspect may include one or more of the following features. For example, the inner housing can include an inner housing body having a cylindrical shape, and a plurality of legs that protrude from the inner housing body and are coupled to the bracket. In some examples, the bracket can include a bearing accommodation portion that receives the second bearing, and a plurality of bridges that extend from the bearing accommodation portion toward the stator. In some examples, each of the plurality of bridges can include a leg contact portion that is in contact with one of the plurality of legs. In some examples, the leg contact portion can be recessed from an outer surface of one of the plurality of bridges in a thickness direction.

In some implementations, the stator can include a stator core that includes a plurality of coupling protrusions protruding from an outer surface of the stator core in a radial direction and extending in the axial direction, and a stator coil that is wound around at least a portion of the stator core. The inner housing can define a plurality of slits, where each of the plurality of slits receives one of the plurality of coupling protrusions. In some examples, each of the plurality of slits extends through one of the plurality of legs, and each of the plurality of bridges can include an insertion protrusion that is inserted into one of the plurality of slits.

In some examples, each of the plurality of bridges can include a side coupling portion coupled to a side surface of one of the plurality of legs. In some examples, each of the plurality of bridges further can include an outer surface coupling portion coupled to an outer surface of one of the plurality of legs. In some examples, the outer surface coupling portion can be bent or curved from the side coupling portion or the insertion protrusion.

In some implementations, each of the plurality of legs can include a side portion that extends from an end of the inner housing, where a circumferential width of the side portion decreases in a direction away from the end of the inner housing. In some examples, the circumferential width of the side portion can be greater than a circumferential width of one of the plurality of bridges. In some examples, the side portion can have a curved shape or a linear shape that is inclined with respect to the axial direction.

In some implementations, the stator can include an insulator made of an insulation material and disposed between the stator core and the stator coil, and the insulator can include an end turn insulation portion that protrudes toward the impeller relative to an end of the stator core and that is disposed at a position corresponding to an end turn portion of the stator coil. In some implementations, the electric motor assembly can include a printed circuit board (PCB) disposed at one side of the bracket and electrically connected to the stator coil. In some examples, the PCB can include a plurality of connection pins that are electrically connected to the stator coil.

In some implementations, the plurality of bridges can be bonded to the plurality of legs by an adhesive. In some examples, each of the plurality of bridges can have an end contact portion that is in surface contact with the end of the stator.

In some implementations, the inner housing can have an upstream end located adjacent to the impeller, and a downstream end located away from the impeller, and the downstream end of the inner housing protrudes outward relative to an end of the outer housing in a flowing direction of air moved by the impeller.

According to another aspect, a hair dryer includes an electric motor assembly. The hair dryer can include a hair dryer body that defines an air outlet port, and a handle that is connected to the hair dryer body and accommodates the electric motor assembly. The handle defines an air inlet port configured to communicate with the air outlet port.

Implementations according this aspect may include one or more of the features of the electric motor assembly described above. For example, the electric motor assembly can include an outer housing, an impeller rotatably disposed in the outer housing, an inner housing that is disposed in the outer housing and defines an air flow path at an outside of the inner housing, a stator disposed in the inner housing, a rotor disposed in the inner housing, the rotor comprising a rotating shaft coupled to the impeller, a first bearing that is disposed in the inner housing and supports a first side of the rotating shaft, a second bearing that disposed in the inner housing and supports a second side of the rotating shaft, where the rotor is disposed between the first bearing and the second bearing, and a bracket that is disposed at the second bearing and that is in contact with an end of the stator, where the bracket is coupled to the inner housing in an axial direction of the inner housing.

In some examples, an external size of the outer housing compared to a size of the stator may not be significantly increased.

In some examples, as the both sides of the rotor are supported by the bearings, an air gap between the stator and the rotor may be stably maintained.

In some implementations, since a difference in size between the outer housing and the stator is not great, the size of the stator and the rotor may not be excessively reduced even if the size of the outer housing is reduced, thereby easily achieving an output of the electric motor assembly.

In some implementations, the inner housing and the bracket may be adhesively bonded to each other by an adhesive. This may suppress an excessive increase in a radial size of the electric motor assembly for coupling between the inner housing and the bracket.

In some implementations, the bearing may be configured as a ball bearing. Accordingly, rotational resistance when the rotating shaft of the rotor rotates may be reduced.

In some implementations, a lateral displacement of the rotor and/or the rotating shaft when the rotor rotates may be suppressed or reduced. This may enable high-speed rotation of the rotor. For example, the rotor may be configured to rotate at 110 to 150 krpm. In some examples, the rotor may be configured to rotate at 120 to 140 krpm.

In some implementations, the outer housing and the inner housing may be made of a metal member or material. In some examples, the outer housing and the inner housing may be manufactured by die casting. In some implementations, the outer housing and the inner housing may be made of aluminum, copper, brass, or zinc. In some examples, the outer housing and the inner housing may be made of an alloy including at least one of aluminum, copper, brass, and zinc.

In some implementations, the bracket may be made of a metal member or material. For example, the bracket may be made of aluminum, copper, brass, or zinc. In some examples, the bracket may be made of an alloy including at least one of aluminum, copper, brass, and zinc.

The bearing accommodation portion may have a cylindrical shape with one side open.

In some implementations, the plurality of bridges may each include a radial section that radially protrudes from an outer surface of the bearing accommodation portion and an axial section that axially protrudes from the radial section.

The leg contact portions may be formed by cutting outer surfaces of the plurality of bridges in a thickness direction, respectively.

In some implementations, the stator and the inner housing may be constrained to each other in a circumferential direction when coupled to each other. As a result, a coupling force between the stator and the inner housing in the circumferential direction may be enhanced.

In some implementations, the plurality of slits may extend by penetrating through the plurality of legs, receptively. This may allow the plurality of legs to be separated from each other along the circumferential direction.

In some implementations, each of the plurality of bridges may include an insertion protrusion that is inserted into the slit. Accordingly, the inner housing and the bracket may be constrained to each other in the circumferential direction when coupled to each other. As a result, a coupling force between the inner housing and the bracket in the circumferential direction may be increased.

In some implementations, the plurality of bridges may include side coupling portions coupled to outer sides of the plurality of legs, respectively. Accordingly, when the plurality of bridges and the plurality of legs are coupled, respectively, a circumferential coupling force may be further increased.

In some implementations, the plurality of bridges may include outer surface coupling portions coupled to outer surfaces of the plurality of legs, respectively. Accordingly, a coupling force between the plurality of bridges and the plurality of legs may be further enhanced.

In some implementations, the outer surface coupling portions may be bent from the side coupling portions, respectively. The outer surface coupling portion may be bent from the insertion protrusion. Each of the plurality of legs may include a side portion having a cross-sectional shape that gradually decreases in width from an end of the inner housing. Accordingly, strength that supports the plurality of legs may be increased. As a result, deformation of the plurality of legs may be suppressed or reduced.

In some implementations, the side portions of the plurality of legs may have a wider width than a width of the plurality of bridges. Accordingly, strength that supports the plurality of legs may be increased. Further, deformation may be suppressed when the plurality of legs and the plurality of bridges are coupled to each other, respectively.

In some implementations, the stator may be include an insulator made of an insulation member and provided between the stator core and the stator coil. Accordingly, an occurrence of a short circuit between the stator core and the stator coil may be suppressed. In some example, the insulator may include an end turn insulation portion protruding from an end of the stator core and disposed at an outside of an end turn of the stator coil. Accordingly, an occurrence of a short circuit between the end turn of the stator coil and the bracket may be suppressed.

In some implementations, the stator and the bracket may be constrained in the axial direction when coupled to each other. This may allow an axial coupling force between the stator and the bracket may be increased.

According to another aspect of the subject matter described in this application, a hair dryer includes a hair dryer body having an air outlet port, a handle having an air inlet port and connected to communicate with the hair dryer body, and an electric motor assembly provided inside the handle. The electric motor assembly has the features of described above.

Implementations according to this aspect may include one or more following features. For example, the hair drier may include an electric heater that heats air and that is provided at the handle or the hair dryer body. In some implementations, air introduced through the air inlet port as the electric motor assembly is driven may be heated by the electric heater and may be then discharged through the air outlet port.

In some implementations, a first bearing and a second bearing are provided at both sides of a rotor. As the first bearing is accommodated in an inner housing, the second bearing is accommodated in a bracket, and the bracket is coupled to the inner housing in a radially overlapping manner while being in contact with the stator, an increase in flow resistance of air moved by an impeller may be suppressed or reduced.

In some examples, a radial size of the outer housing, compared to a size of the stator, may not be significantly increased.

In some implementations, as the inner housing and the bracket are radially overlapped with each other in a state that in which ends of the inner housing and the bracket are in contact with each other in an axial direction, an axial clearance and a radial clearance between the inner housing, the stator, and the bracket may be suppressed or reduced. Accordingly, an initial alignment of the stator and the rotor may be securely maintained.

In some implementations, an air gap between the stator and the rotor may be stably maintained.

In some implementations, as the inner housing may include a plurality of legs, the bracket may include a plurality of bridges, and the plurality of bridges may respectively include a leg contact portion in contact with the leg, thereby improving a coupling force between the outer housing and the bracket.

In some implementations, where the stator may include a coupling protrusion, and the inner housing may include a slit to which the coupling protrusion is coupled, a circumferential clearance between the inner housing and the stator may be suppressed.

In some implementations, where the slit penetrates through the leg, and an insertion protrusion inserted into the slit is provided on the bridge of the bracket, a circumferential clearance between the inner housing and the bracket may be suppressed.

In some implementations, where the plurality of bridges of the bracket includes side coupling portions coupled to both sides (outer sides) of the plurality of legs, respectively, a coupling force between the plurality of legs and the plurality of bridges may be increased.

In some implementations, where the plurality of bridges includes outer surface coupling portions coupled to outer surfaces of the plurality of legs, respectively, a coupling force between the plurality of legs and the plurality of bridges may be enhanced.

DETAILED DESCRIPTION

Figure 1:
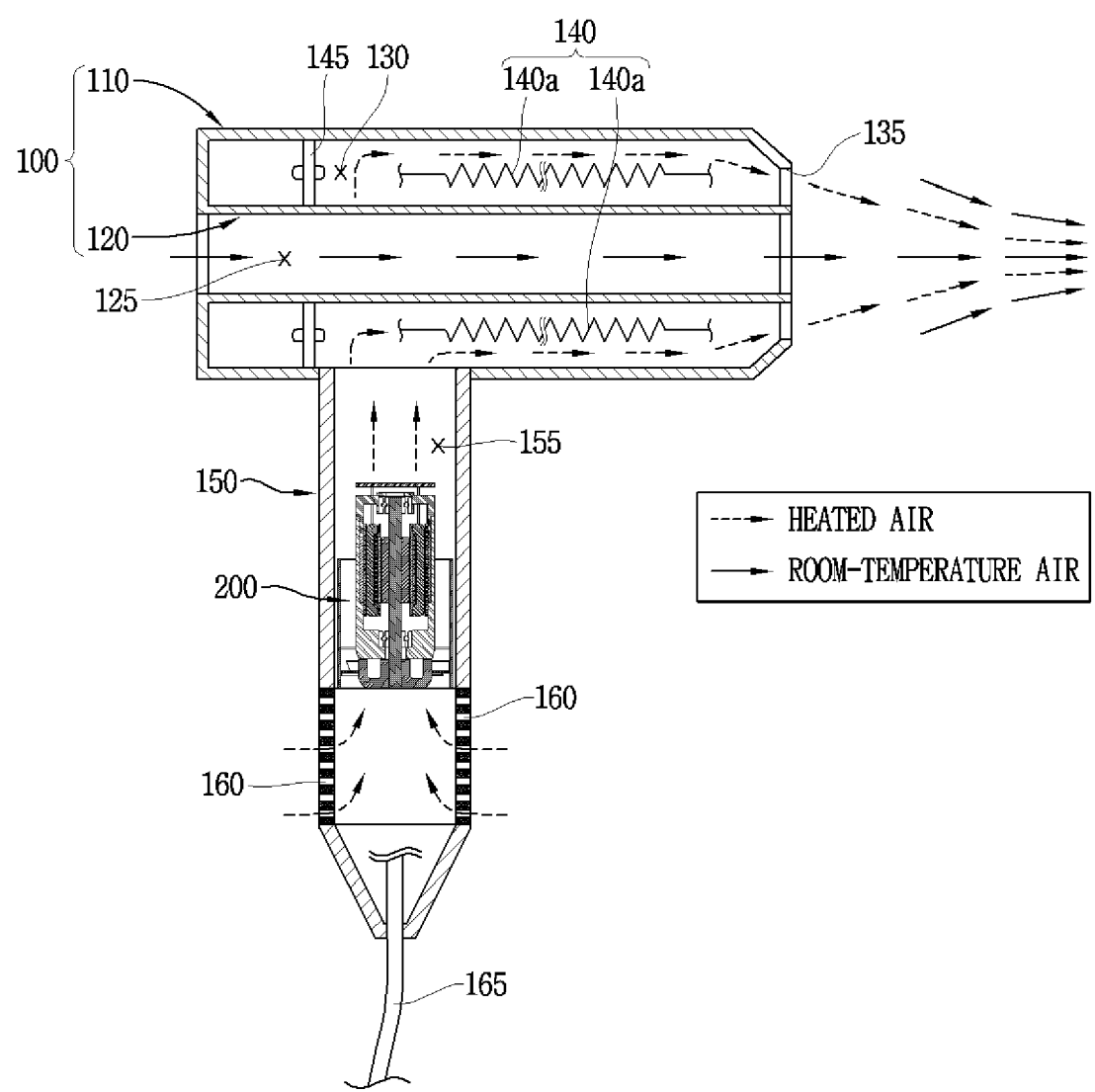
FIG. 1 is a cross-sectional view showing an example of a hair dryer having an electric motor assembly.

Hereinafter, one or more implementations of the present disclosure will be described in detail with reference to the accompanying drawings. Herein, like reference numerals denote like elements even in different implementations, and a description for an element appearing first will replace descriptions for like elements appearing later.

FIG. 1 is a cross-sectional view of an example of a hair dryer including an example of an electric motor assembly. As illustrated in FIG. 1, a hair dryer equipped with an electric motor assembly includes a hair dryer body 100, a handle 150, and an electric motor assembly 200.

The hair dryer body 100 includes therein an air flow path (or passage) 130.

An air outlet port 135 may be defined at one side (right end in the drawing) of the hair dryer body 100 so as to allow air to be discharged.

A penetrating portion (e.g., through-hole) 125 may be defined at a middle or central part of the hair dryer body 100, for example.

When air is discharged through the air outlet port 135, air discharged from an inside of the penetrating portion 125 and the air discharged from the air outlet port 135 come or join together.

The hair dryer body 100 includes an outer case 110 and an inner case 120 provided inside the outer case 110.

The air flow path 130 may be defined between the inner case 120 and the outer case 110, for example.

The air outlet port 135 may be defined between the outer case 110 and the inner case 120.

The air flow path 130 may be configured to have, for example, a tube-shaped cross section.

The air flow path 130 may accommodate an electric heater 140 so as to allow air to be heated.

For example, the electric heater 140 may include a heating member 140a configured to be heated by electrical resistance heat when power is applied.

In some examples, the heating member 140a may be implemented as a nichrome wire. In some examples, the heating member 140a has a coil shape.

In some implementations, the hair dryer body 100 may include the outer case 110 and the inner case 120. However, this is just an example among many others, and the hair dryer body 100 may be provided therein with the air flow path 130.

A printed circuit board (PCB) 145 may be provided in one side (left side in the drawing) of the hair dryer body 100.

The PCB 145 may be electrically connected to the electric heater 140, for example.

The PCB 145 may be configured to control the electric heater 140, for example.

The PCB 145 may include, for example, a control circuit that controls the electric heater 140.

The PCB 145 may include, for example, a control circuit that controls the electric motor assembly 200.

In some implementations, a signal input portion (e.g., button) to which a signal for adjusting a temperature of the electric heater 140 is input may be provided on the hair dryer body 100, or the handle 150.

In some implementations, a signal input portion (e.g., button) to which a signal for controlling operation of the electric motor assembly 200 is input may be provided on the hair dryer body 100, or the handle 150.

The handle 150 may be provided at one side (lower side in the drawing) of the hair dryer body 100.

An accommodation space 155 is formed inside the handle 150.

An air inlet port 160 may be defined at one region (lower region in the drawing) of the handle 150 so as to allow air to be sucked into the handle 150.

An upper end of the handle 150 is connected to communicate with the hair dryer body 100.

Accordingly, an air that has passed through an inside of the handle 150 may be introduced into the hair dryer body 100.

The electric motor assembly 200 is accommodated in the handle 150.

The electric motor assembly 200 may include an impeller 210 to facilitate a flow of air during use.

The air inlet port 160 is formed at one side (lower side in the drawing) of the electric motor assembly 200.

A power supply cable 165 connected to an external power source is provided at a lower end of the handle 150.

This may allow electric power to be supplied to electrical components inside the handle 150 and the hair dryer body 100.

In some implementations, the cable 165 is connected to the electric motor assembly 200, the PCB 145, and the electric heater 140.

Figure 2:
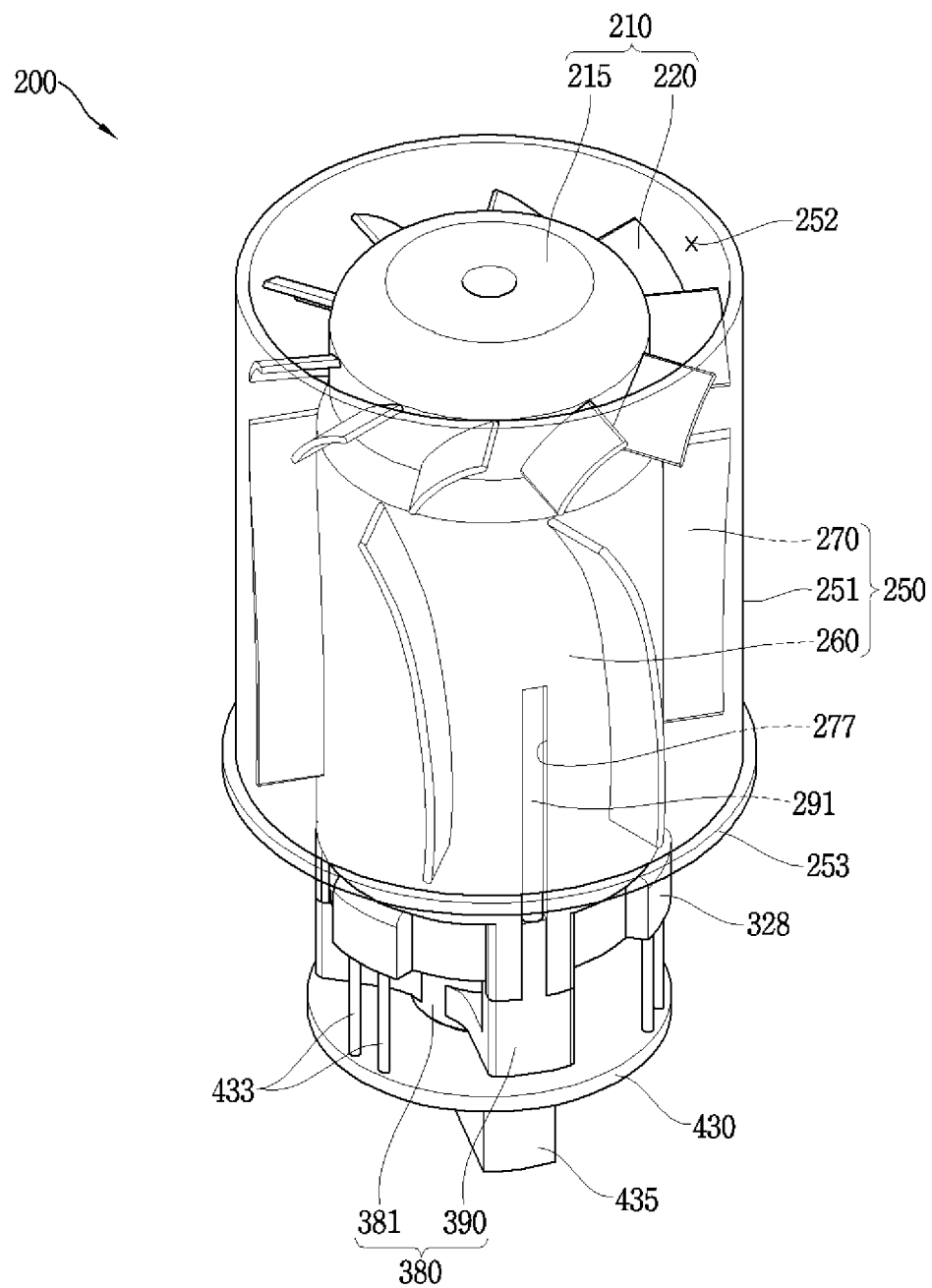
FIG. 2 is a perspective view showing the electric motor assembly of FIG. 1.
Figure 3:
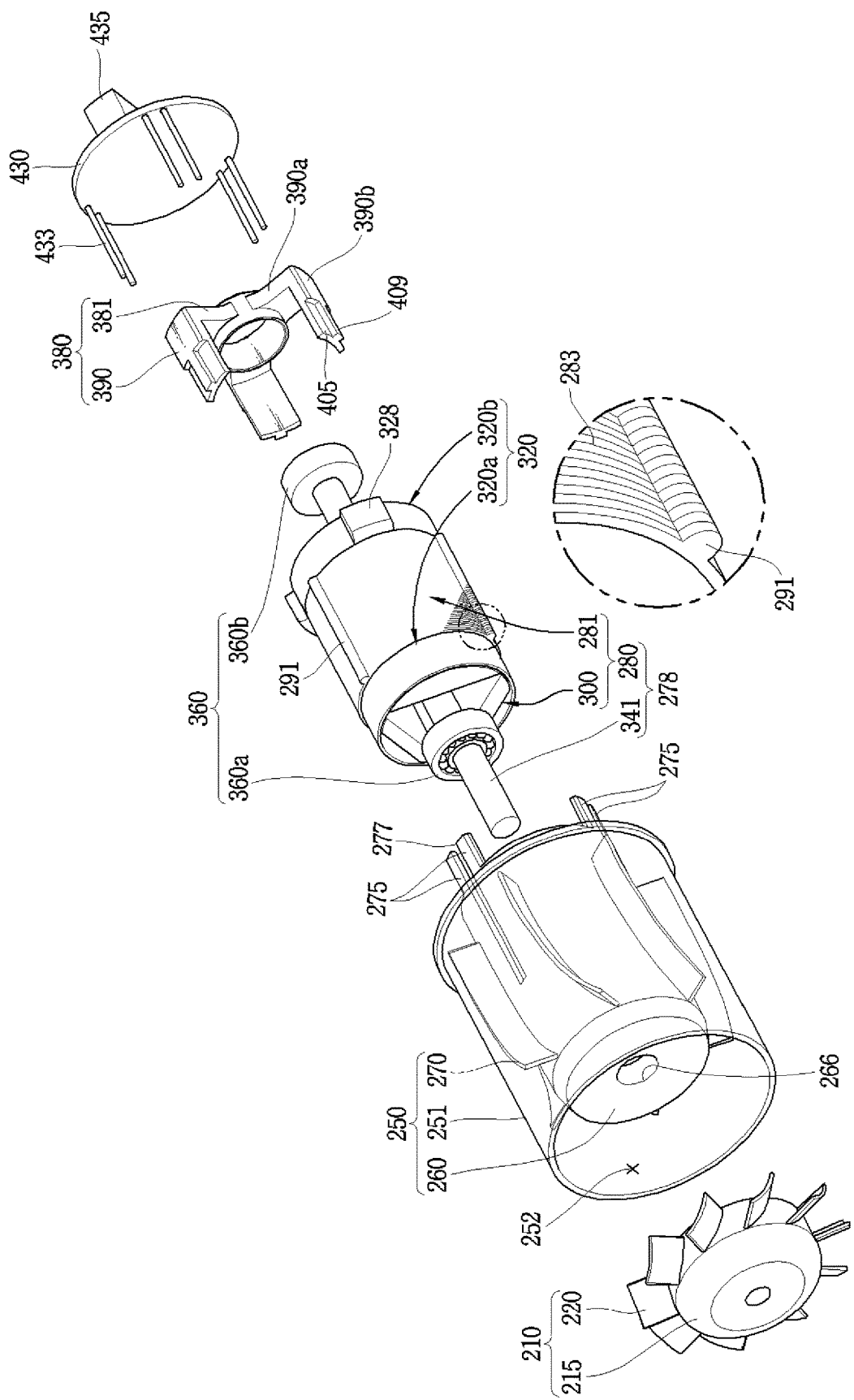
FIG. 3 is an exploded perspective view showing the electric motor assembly of FIG. 2.
Figure 4:
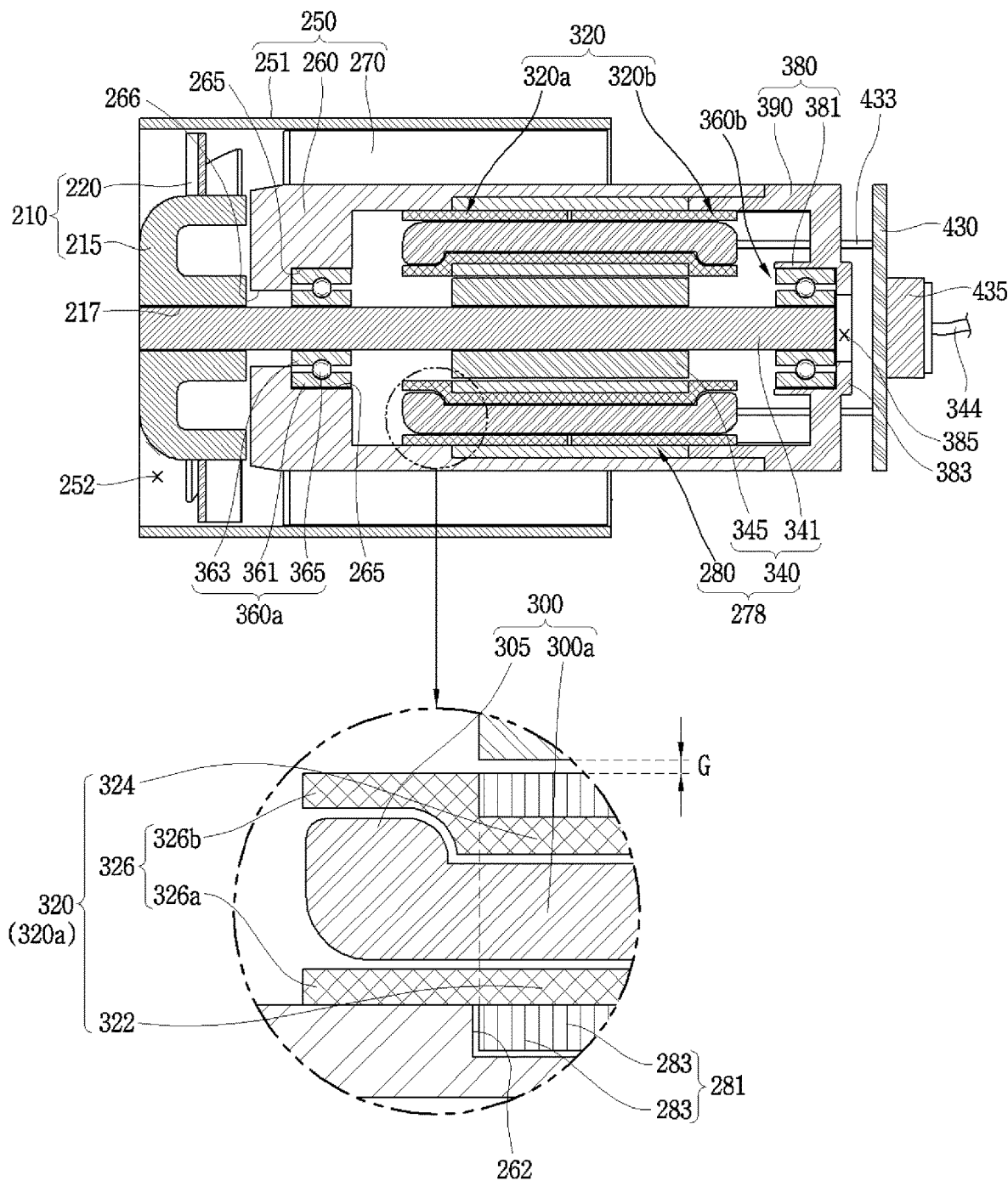
FIG. 4 is a cross-sectional view of FIG. 2.

FIG. 2 is a perspective view showing the electric motor assembly of FIG. 1, FIG. 3 is an exploded perspective view showing the electric motor assembly of FIG. 2, and FIG. 4 is a cross-sectional view of FIG. 2. As illustrated in FIGS. 2 to 4, the electric motor assembly 200 includes the impeller 210, a housing 250, an impeller driving unit 278, a first bearing 360a, a second bearing 360b, and the bracket 380.

The impeller 210 includes a hub 215 and a plurality of blades 220 disposed in a circumference of the hub 215.

A rotating (or rotational) shaft 341 of the impeller driving unit 278 is coupled to the hub 215.

The hub 215 may be provided at its center with a rotating shaft coupling portion 217 to which the rotating shaft 341 is coupled. The rotating shaft coupling portion 217 may be axially formed through the hub 215, for example.

The rotating shaft coupling portion 217 may be configured to have a gap with the rotating shaft 341. This may allow air at an outside of the inner housing 260 to be introduced therein.

The plurality of blades 220 is spaced apart from one another along a circumferential direction of the hub 215 and is inclined with respect to an axial direction.

The impeller 210 is configured to rotate counterclockwise in the drawing.

When the impeller 210 rotates, air is sucked from a tip end (upper side in the drawing) of the impeller 210 along the axial direction and flows in a direction away from the impeller 210 (downward direction in the drawing).

That is, in FIG. 2, the upper side is an upstream side and the lower side is a downstream side based on a flow direction (moving direction) of air moved by the impeller 210.

The impeller 210 may be made of, for example, a metal member or material. For example, the impeller 210 may be made of, for example, an aluminum (Al) member. Accordingly, deformation of the impeller 210 when rotating at a high speed may be suppressed or reduced.

The housing 250 includes an outer housing 251 and an inner housing 260 that are disposed concentrically with respect to each other.

The impeller 210 is accommodated in the outer housing 251.

In some implementations, an impeller accommodation (or accommodating) space 252 in which the impeller 210 is accommodated is formed at an upper end of the outer housing 251.

When the impeller 210 rotates, air is introduced from the upper end (inflow end) of the outer housing 251, and air is discharged to the outside from a lower end (outflow end) of the outer housing 251.

When the impeller 210 rotates, the upper end of the outer housing 251 may be referred to as an "upstream end (or inflow end)", and the lower end may be referred to as a "downstream end (or outflow end)".

The inner housing 260 is disposed inside the outer housing 251.

The impeller 210 is accommodated in one side of the outer housing 251, and the inner housing 260 is disposed at one side of the impeller 210 in the outer housing 251.

The impeller accommodation space 252 is defined by an inner diameter surface of a circumferential surface of the outer housing 251 and the upstream end of the inner housing 260.

A plurality of vanes 270 may be provided between the outer housing 251 and the inner housing 260.

Each of the plurality of vanes 270 protrudes from an outer surface of the inner housing 260 along a radial direction and extends in the axial direction.

The plurality of vanes 270 is spaced apart from one another at a predetermined interval along a circumferential direction of the inner housing 260.

Each of the plurality of vanes 270 can include a first end (upstream end or inflow end) that is located close to the impeller 210 and a second end (downstream end or outflow end) that is located away from the impeller 210. The upstream end adjacent to the impeller 210 is located rearward relative to the downstream end distant from the impeller 210 with respect to a rotation direction of the impeller 210.

Accordingly, air moved into the outer housing 251 by the impeller 210 is properly distributed, allowing the air to flow along the axial direction in a stable manner.

The housing 250 may be made of a metal material. In some examples, the housing 250 may be formed by die casting. For example, the housing 250 may be made of, for example, aluminum, copper, brass, or zinc. In some examples, the housing 250 may be made of an alloy including at least one of aluminum, copper, brass, and zinc, for example.

In some implementations, an outer diameter of the outer housing 251 may be, for example, less than or equal to 20.0 mm.

With this configuration, the handle 150 may have a slim appearance.

As the outer housing 251 has the relatively small outer diameter, an excessive increase in an outer diameter of the handle 150 may be suppressed.

This may allow the handle 150 to be easily held or grasped.

Further, an external size and weight of the electric motor assembly 200 may be reduced, thereby ensuring convenient use of the hair dryer.

The impeller driving unit 278 that causes the impeller 210 to be rotatably driven is provided inside the inner housing 260.

The impeller driving unit 278 may include, for example, a stator 280 and a rotor 340 having the rotating shaft 341 to be rotatably disposed with respect to the stator 280.

The stator 280 may include, for example, a stator core 281 and a stator coil 300 wound on the stator core 281.

A bearing accommodation portion 265 in which the first bearing 360a is accommodated is provided at one end (inflow end) of the inner housing 260.

The upstream end of the inner housing 260 has a thickness greater than a thickness (axial thickness) of a bearing 360.

Accordingly, when the first bearing 360a and the rotating shaft 341 are coupled to each other, deformation may be suppressed, and the first bearing 360a and the rotating shaft 341 may be securely supported.

A rotating shaft hole 266 may be formed through the upstream end of the inner housing 260, so as to allow the rotating shaft 341 to pass therethrough.

The rotating shaft hole 266 may be spaced apart from an outer surface of the rotating shaft 341 by a predetermined length. Accordingly, heat dissipation of the first bearing 360a may be facilitated.

A stopper 262 that limits a coupling depth of the impeller driving unit 278 (stator 280) may be provided inside the inner housing 260.

Here, the stopper 262 may be configured such that an axial length from an end of the inner housing 260 to the stopper 262 may be equal to an axial length of the stator core 281.

Accordingly, when the stator core 281 is accommodated in the inner housing 260, the end of the inner housing 260 and an end of the stator core 281 may be disposed on the same plane.

The stopper 262 may protrude from an inner surface of the inner housing 260 along the radial direction.

The stopper 262 may have a circular shape, for example.

The stopper 262 may be spaced apart from the bearing accommodation portion 265 along the axial direction by a predetermined distance.

In some implementations, as shown in FIG. 4, the end of the stator 280 may be spaced apart from the bearing accommodation portion 265 by a predetermined distance.

Here, the stopper 262 may be spaced apart from the bearing accommodation portion 265 by approximately twice an axial protrusion length of an end turn 305 of the stator coil 300, for example.

In some implementations, the stator coil 300 may be configured to be driven by, for example, a three-phase AC power source.

The stator core 281 may include, for example, a rotor receiving hole 285 in which the rotor 340 is rotatably accommodated.

Figure 6:
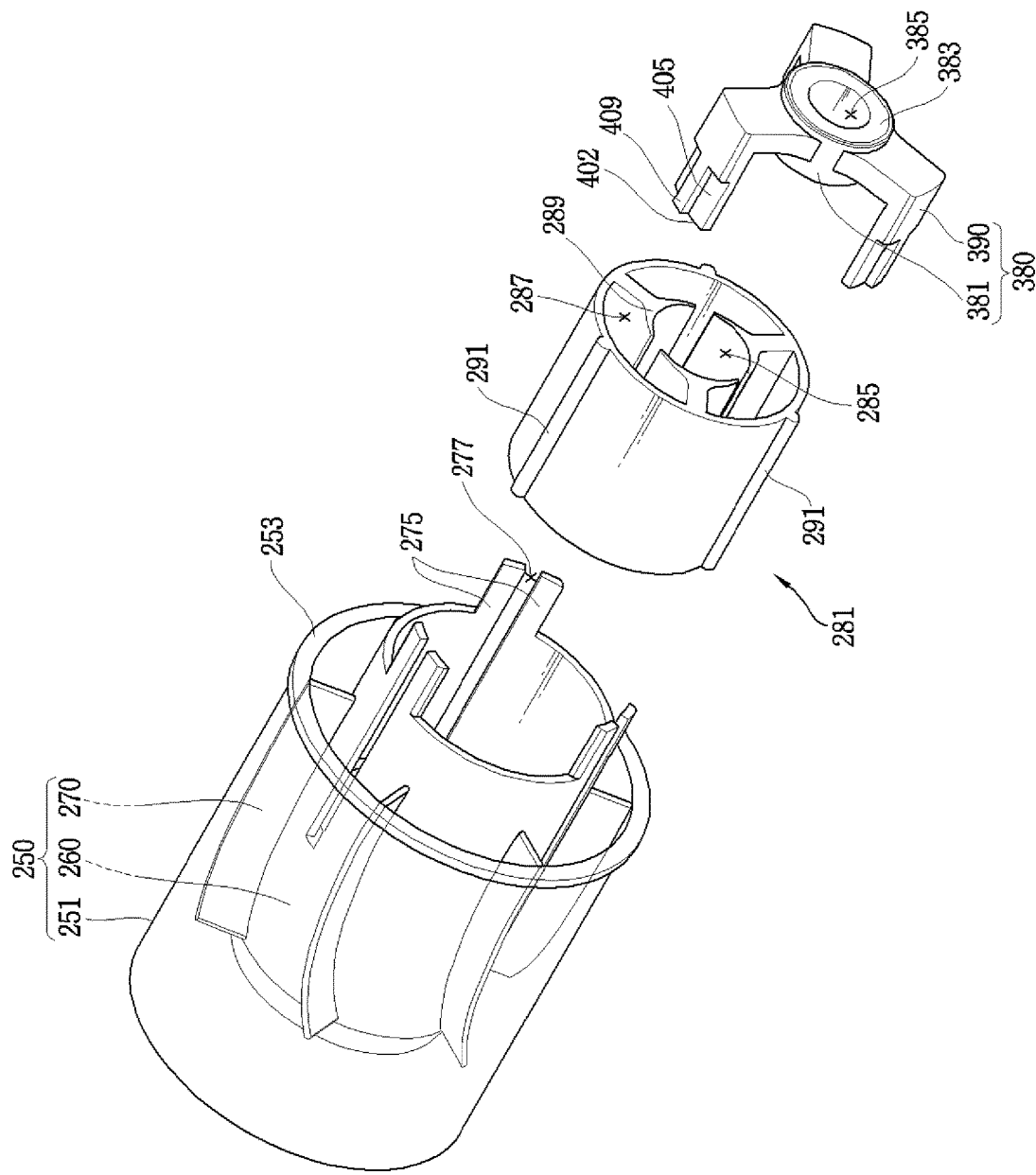
FIG. 6 is an exploded view showing examples of an inner housing, a stator core, and the bracket of FIG. 3.

The stator core 281 may include a plurality of slots 287 and teeth 289 alternatively disposed along a circumference of the rotor receiving hole 285 (see FIG. 6).

The stator core 281 may be formed by stacking in an insulating manner a plurality of electrical steel plates 283 each having the rotor receiving hole 285, the slots 287, and the teeth 289, for example.

In some example, the plurality of teeth 289 may be three teeth. the plurality of slots 287 may be three slots, for example.

A coupling protrusion 291 that protrudes in the radial direction and extends in the axial direction is provided at an outer surface of the stator core 281.

The coupling protrusion 291 is provided in plurality so as to be spaced apart from each another along a circumferential direction of the stator core 281.

The stator coil 300 may be configured as concentrated winding, for example.

The stator coil 300 includes, for example, a plurality of coil portions 300a intensively wound around the plurality of teeth 289, respectively.

The plurality of coil portions 300a may be respectively connected to each phase (U phase, V phase, and W phase) of a three-phase AC power supply, for example.

The stator coil 300 may include the end turn 305 that protrudes to both sides of the stator core 281.

Each of the plurality of coil portions 300a may include the end turn 305.

The rotor 340 may include, for example, the rotating shaft 341 and a permanent magnet 345 that rotates with respect to the rotating shaft 341.

The rotor 340 may be configured such that an outer diameter of the permanent magnet 345 is less than or equal to 6 mm, for example.

Accordingly, weight of the rotor 340 may be significantly reduced.

The rotating shaft 341 is configured to protrude to both sides (left and right sides in the drawing) of the rotor 340.

The rotating shaft 341 may have an outer diameter of 3 mm or less, for example.

The stator 280 and the rotor 340 may be configured to be rotated at 110 to 150 krpm, for example.

In some implementations, the stator 280 and the rotor 340 may be configured to be rotated at 120 to 140 krpm, for example.

The stator 280 includes an insulator 320 for insulating the stator core 281 and the stator coil 300.

The insulator 320 may be made of an insulation member or material.

In some implementations, the insulator 320 may include, for example, a first insulator 320a and a second insulator 320b that are coupled to both sides of the stator core 281, respectively, along the axial direction.

The insulator 320 (the first insulator 320a and the second insulator 320b) may include, for example, a slot insulation portion 322 disposed between the stator coil 300 and the slot 287, and a tooth insulation portion 324 disposed between the stator coil 300 and the tooth 289.

The insulator 320 includes, for example, an end turn insulation portion 326 disposed at a periphery of the end turn 305 of the stator coil 300.

The end turn insulation portion 326 is formed in a cylindrical shape.

The bearing 360 that supports the rotating shaft 341 is provided at both sides of the rotor 340.

The bearing 360 includes, for example, the first bearing 360a provided at one side of the rotor 340 (left side in the drawing) and the second bearing 360b provided at another side of the rotor 340 (right side in the drawing).

The bearing 360 (the first bearing 360a, the second bearing 360b) is configured as a ball bearing, for example.

Accordingly, rotational resistance when the rotating shaft 341 rotates may be significantly reduced.

The bearing 360 (the first bearing 360a and the second bearing 360b) includes an outer ring 361, an inner ring 363 concentrically spaced apart from the outer ring 361, and a plurality of balls 365 disposed between the outer ring 361 and the inner ring 363.

In addition, as the first bearing 360a and the second bearing 360b are provided at both sides of the rotor 340, respectively, lateral displacement of the rotor 340 and/or vibration may be significantly reduced when the rotor 340 rotates.

Thus, an air gap G between the stator 280 and the rotor 340 may be uniformly maintained.

This configuration allows the rotor 340 to be rotated at a high speed, and vibration and noise to be significantly reduced when the rotor 340 rotates at the high speed.

In some implementations, the bracket 380 that supports the bearing 360 (second bearing 360b) is provided at another side of the rotor 340 (right side in the drawing).

The bracket 380 may include a bearing accommodation portion 381 in which the bearing 360 (second bearing 360b) is accommodated and a plurality of bridges 390 axially extending from the bearing accommodation portion 381.

In some implementations, the bracket 380 may be made of a metal member or material. The bracket 380 may be made by, for example, die casting. In some examples, the bracket 380 may be made of, for example, aluminum, copper, brass, or zinc. In some examples, the bracket 380 may be made of an alloy including at least one of the aluminum, copper, brass, and zinc, for example.

The plurality of bridges 390 may be, for example, three in number.

The plurality of bridges 390 may be spaced apart from one another along a circumference direction of the bearing accommodation portion 381 by a predetermined interval.

A printed circuit board (PCB) 430 that is electrically connected to the stator coil 300 is provided at one side of the bracket 380 (right side of the drawing).

The PCB 430 is formed in a disk shape, for example.

In some implementations, the PCB 430 has a disk shape. However, this is just an example, and other various shapes such as a triangular shape and a "Y" shape may also be available.

The PCB 430 includes a plurality of connection pins 433 connected to the stator coil 300.

The plurality of connection pins 433 may be, for example, six in number.

The plurality of connection pins 433 is connected to the insulator 320.

Three of the plurality of connection pins 433 are respectively connected to one end of the three-phase (U-phase, V-phase, and W-phase) coil portion 300a of the stator coil 300 so as to supply power.

The remaining three of the connection pins 433 serve as a neutral wire connecting (wiring) another ends of the three-phase (U-phase, V-phase, W-phase) coil portion 300a of the stator coil 300 into one.

A connector 435 to which the cable 165 connected to an external power source (commercial power source) is connected is provided at one side of the PCB 430.

Figure 5:
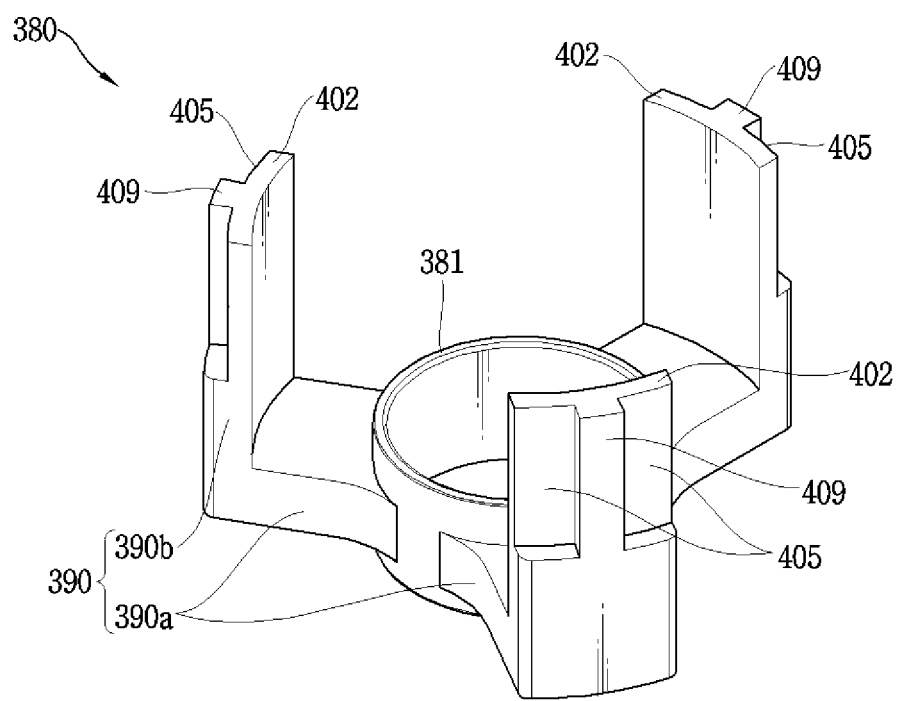
FIG. 5 is an enlarged perspective view showing an example of a bracket of FIG. 3.

FIG. 5 is an enlarged perspective view of the bracket in FIG. 3. As illustrated in FIG. 5, the bracket 380 includes the bearing accommodation portion 381 in which the second bearing 360b is accommodated and the plurality of bridges 390 protruding toward the stator 280 from the bearing accommodation portion 381.

The bearing accommodation portion 381 is formed in a cylindrical shape with one side open.

The bearing accommodation portion 381 has an inner diameter corresponding to an outer diameter of the second bearing 360b.

The bearing accommodation portion 381 may be configured such that the second bearing 360b is press-fitted thereto.

A stopper 383 that limits an insertion depth of the second bearing 360b may be provided at an outer end of the bearing accommodation portion 381 along the axial direction.

The stopper 383 may be provided at its center with a penetrating portion 385 (e.g., a through-hole).

Accordingly, heat dissipation of the second bearing 360b may be facilitated.

The plurality of bridges 390 may be, for example, three in number.

The plurality of bridges 390 may be spaced 120 degrees apart from one another along a circumferential direction of the bearing accommodation portion 381, for example.

Each of the plurality of bridges 390 may include, for example, a radial section 390a radially protruding from the bearing accommodation portion 381 and an axial section 390b bent from the radial section 390a to extend in the axial direction.

Each of the plurality of bridges 390 includes, for example, an end contact portion 402 in contact with an end of the stator core 281.

The end contact portion 402 is formed at an end of the axial section 390b.

The axial section 390b has an inner surface that corresponds to an inner diameter of the stator core 281.

The plurality of bridges 390 may be configured such that an outer surface thereof has an outer diameter that matches an outer diameter of the inner housing 260 (see FIG. 4).

Accordingly, an outer surface of the bracket 380 (the axial section 390b) is configured to have the same outer diameter as the inner housing 260, an increase in flow resistance of air flowing along a gap between the inner housing 260 and the outer housing 251 (air flow path) by the impeller 210 may be suppressed.

Each of the axial sections 390b of the plurality of bridges 390 includes at least one leg contact portion 405. Each of the leg contact portions 405 is in contact with a plurality of legs 275, respectively.

The leg contact portions 405 are respectively formed by cutting an outer surface of the axial sections 390b of the plurality of bridges 390 in a thickness direction.

More specifically, the leg contact portions 405 are cut into a thickness corresponding to a thickness of the plurality of legs 275.

The outer surfaces of the plurality of bridges 390 are configured to have a radius of curvature corresponding to outer surfaces of the plurality of legs 275.

The outer surfaces of the plurality of bridges 390 and the outer surfaces of the plurality of legs 275 form the same curved surface (arcuate surface) when coupled to each other.

The leg contact portions 405 have a thickness (width) that corresponds to the thickness of the plurality of legs 275.

Each of the plurality of bridges 390 may include an insertion protrusion 409 so as to be inserted into a slit 277 of the plurality of legs 275.

The insertion protrusion 409 is provided at the middle or center of the leg contact portion 405 in a manner of protruding along a thickness direction.

Ends of the insertion protrusions 409 of the plurality of bridges 390 and ends of the coupling protrusions 291 of the stator core 281 are aligned in the axial direction to be in contact with each other.

Figure 7:
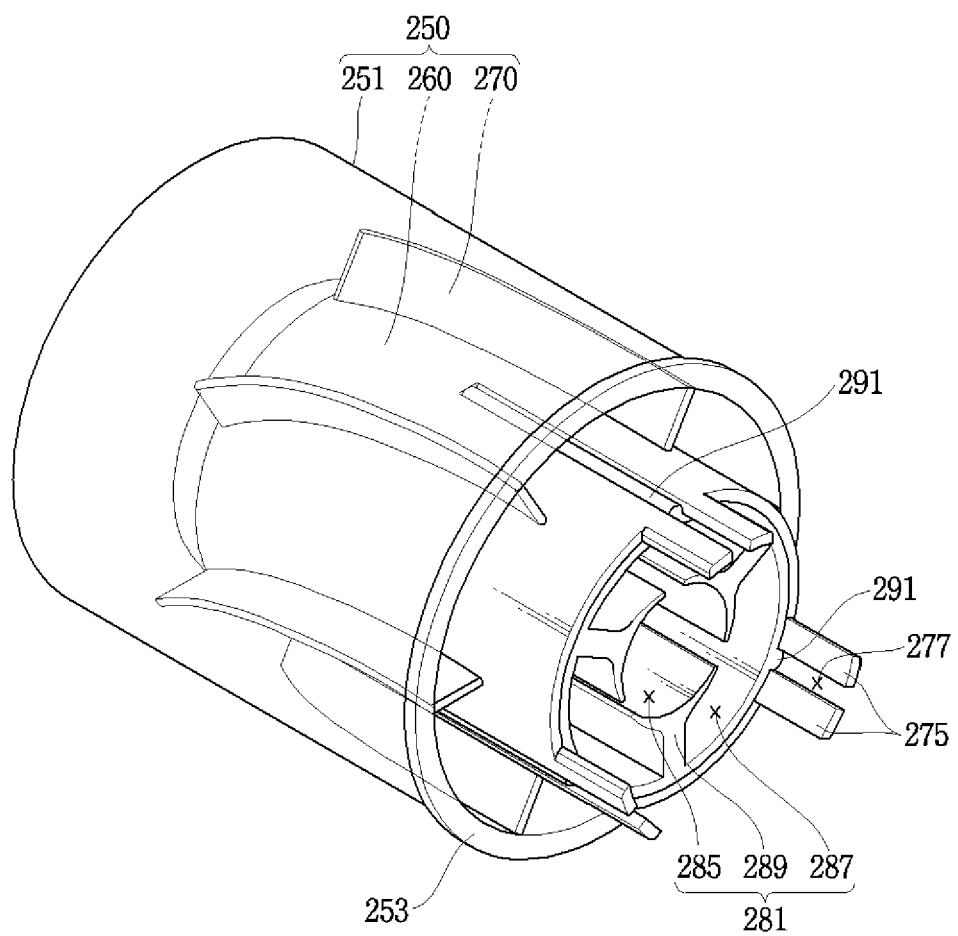
FIG. 7 illustrates an example of a coupled state between the inner housing and the stator core of FIG. 6.

FIG. 6 is an exploded view showing an example of a coupling relationship between the inner housing, the stator core, and the bracket of FIG. 3, and FIG. 7 illustrates an example of a coupled state between the inner housing and the stator core of FIG. 6. As illustrated in FIG. 6, the inner housing 260 is formed such that its outflow end protrudes from the outflow end of the outer housing 251 by a predetermined length along a flow direction of air moved by the impeller 210.

The stator core 281 may be formed by stacking a plurality of electrical steel plates 283 each having the plurality of slots 287 and the teeth 289 in an insulating manner.

The plurality of coupling protrusions 291 is provided on the outer surface of the stator core 281.

The plurality of coupling protrusions 291 may be, for example, three in number.

The plurality of coupling protrusions 291 is disposed on an outer surface of the electrical steel sheet 283 at equal intervals (120 degrees apart) along a circumferential direction.

Correspondingly, the inner housing 260 may include a plurality of slits 277 to allow the coupling protrusions 291 to be accommodated therein, respectively.

The slit 277 extends from the outflow end of the inner housing 260 along the axial direction.

The number of the slits 277 corresponds to the number of the coupling protrusions 291.

The inner housing 260 may include the plurality of legs 275 that is coupled to the bracket 380.

In detail, the plurality of slits 277 may be provided at a position corresponding to a center of the respective legs 275 along the circumferential direction of the inner housing 260.

Accordingly, each of the plurality of legs 275 is divided into two portions along the circumferential direction.

With this configuration, when the stator core 281 is coupled to an inside of the inner housing 260, the coupling protrusions 291 of the stator core 281 are disposed to correspond to the slits 277 of the plurality of legs 275, respectively. Then, when ends of the coupling protrusions 291 of the stator core 281 are axially pressed against entrances (or inlets) of the slits 277, respectively, the coupling protrusions 291 are inserted into the respective slits 277.

When the stator core 281 is continuously pressed, a front end of the stator core 281 is brought into contact with the stopper 262 of the inner housing 260, and the insertion is stopped.

As illustrated in FIG. 7, a rear end of the stator core 281 is disposed on the same plane as the outflow end of the inner housing 260.

Figure 8:
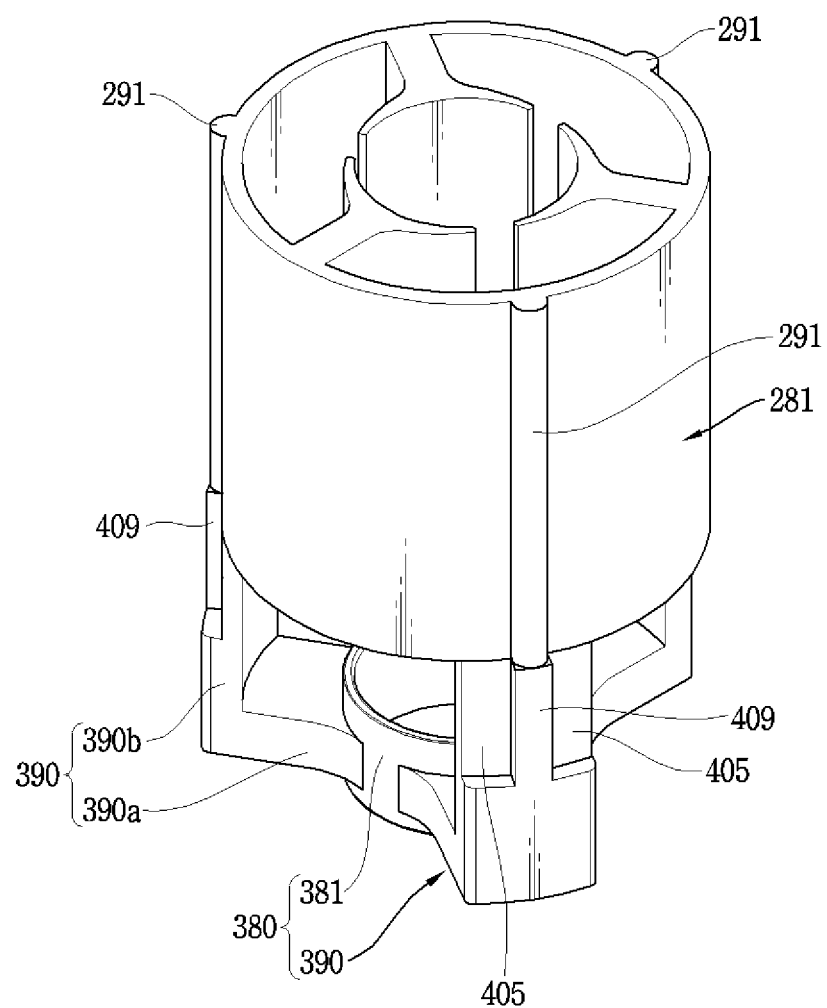
FIG. 8 illustrates an example of a relationship between the stator core and the bracket of FIG. 6.
Figure 9:
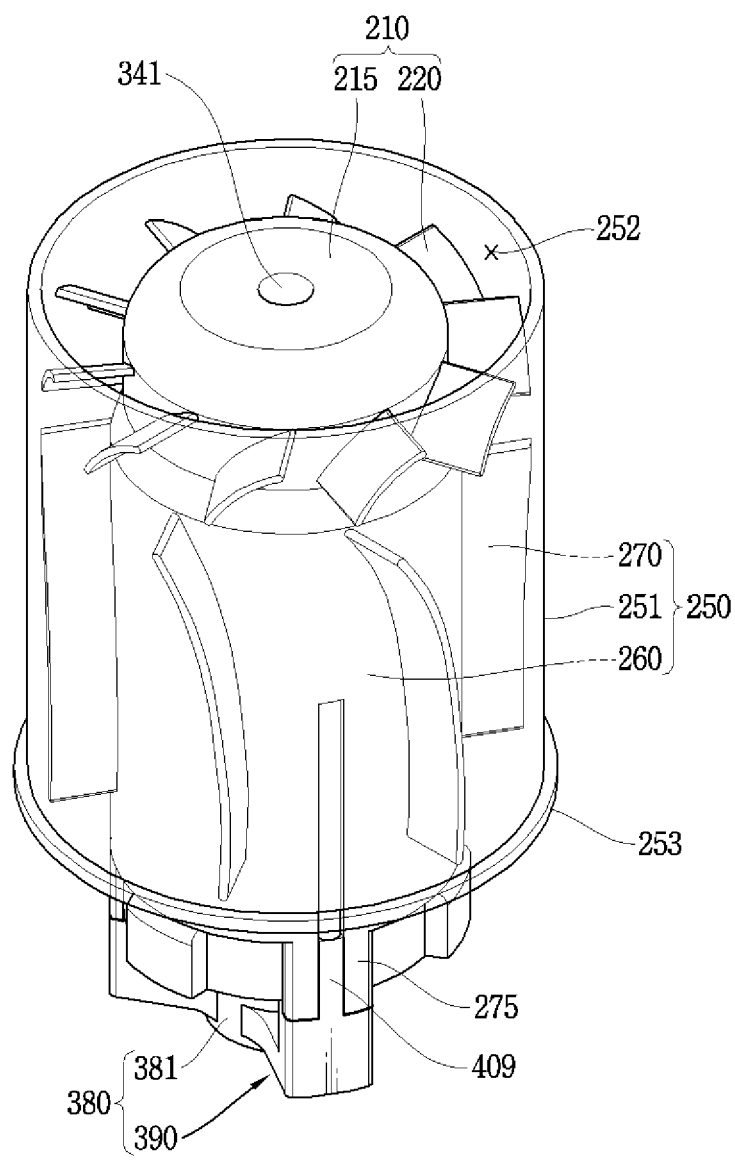
FIG. 9 is a perspective view illustrating an example of a coupled state between the inner housing, the stator core, and the bracket of FIG. 6.

FIG. 8 illustrates an example of a relationship between the stator core and the bracket of FIG. 6, and FIG. 9 is a perspective view illustrating an example of a coupled state between the inner housing, the stator core, and the bracket of FIG. 6. As illustrated in FIG. 8, the plurality of coupling protrusions 291 is formed on the outer surface of the stator core 281.

Each of the plurality of coupling protrusions 291 may be formed to correspond to a center of the respective slots 287 of the stator core 281, for example.

The end contact portions 402 in contact with the end of the stator core 281 are formed at the ends of the plurality of bridges 390 of the bracket 380, respectively.

With this configuration, when coupling the bracket 380 to the inner housing 260 in which the stator core 281 is inserted, the bridges 390 of the bracket 380 are disposed to correspond to the plurality of legs 275 of the inner housing 260, respectively. Then, the bracket 380 is pressed in the axial direction while the insertion protrusions 409 of the bridges 390 are disposed to correspond to the entrances of the slits 277 of the plurality of legs 275, respectively.

Each of the insertion protrusions 409 of the plurality of bridges 390 is inwardly moved relative to the corresponding slit 277.

When each of the end contact portions 402 of the plurality of bridges 390 is in contact with the end of the stator core 281, the plurality of legs 275 is coupled to the leg contact portions 405 of the plurality of bridges 390, respectively, as shown in FIG. 9.

Figure 10:
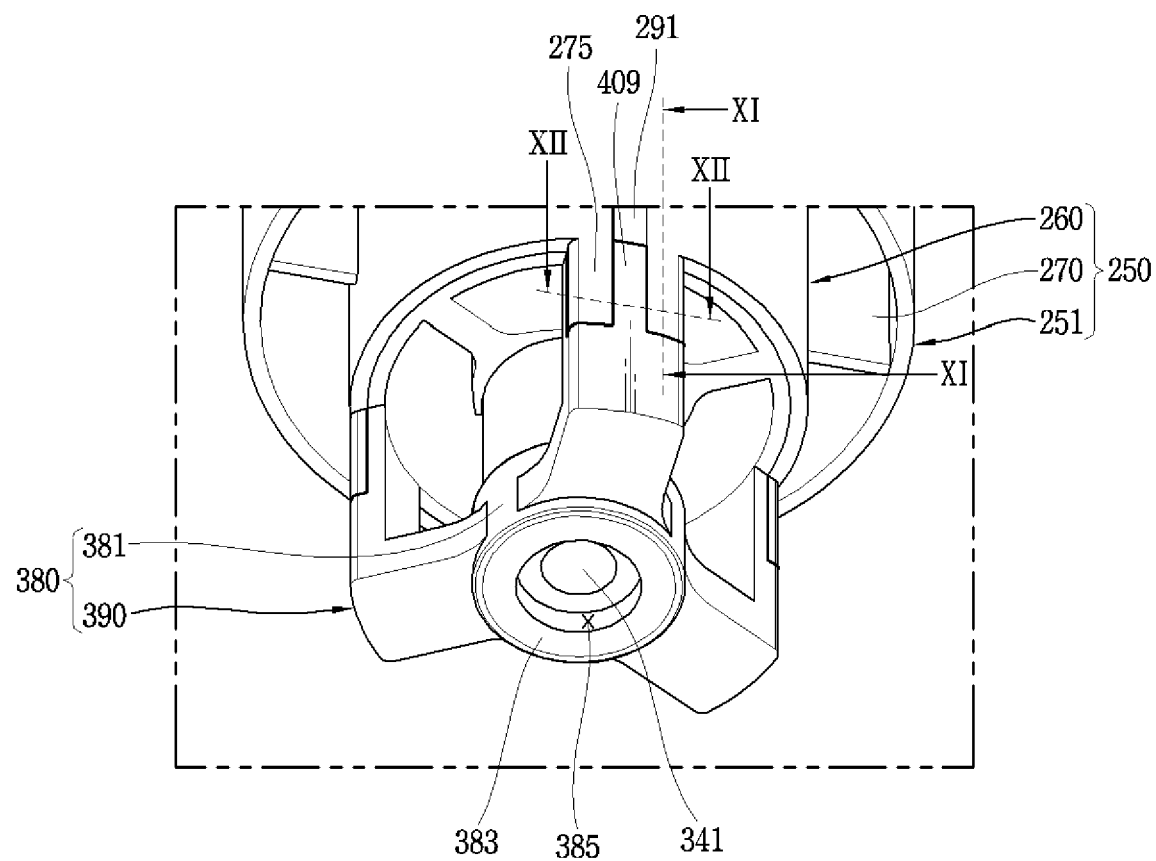
FIG. 10 is an enlarged view illustrating an example of a coupled state between a leg and the bracket of FIG. 9.
Figure 11:
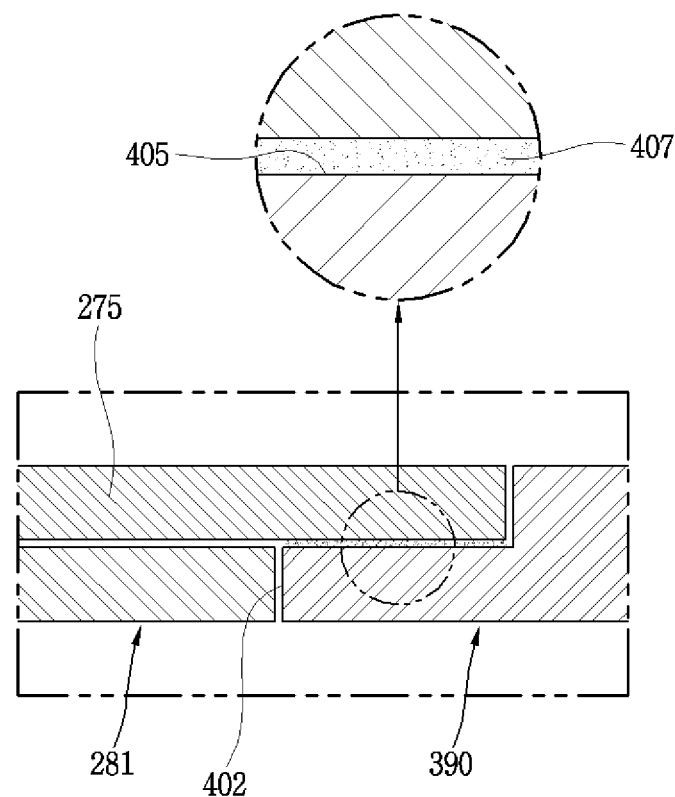
FIG. 11 is an axial cross-sectional view showing the leg of FIG. 10.
Figure 12:
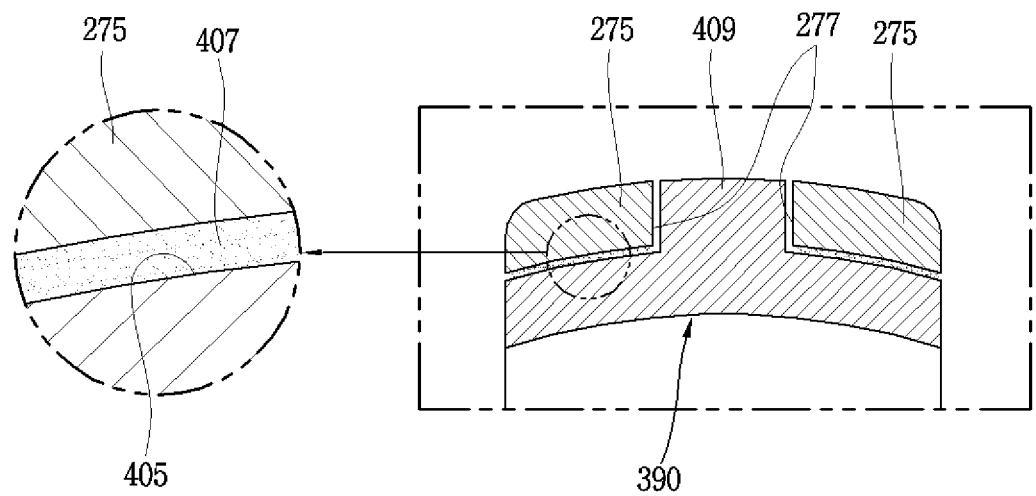
FIG. 12 is a horizontal cross-sectional view showing the leg of FIG. 10.

FIG. 10 is an enlarged view illustrating an example of a coupled state between the leg and the bracket of FIG. 9, FIG. 11 is an axial cross-sectional view showing the leg of FIG. 10, and FIG. 12 is a horizontal cross-sectional view showing the leg of FIG. 10. As illustrated in FIG. 10, the plurality of legs 275 is coupled to the leg contact portions 405 of the plurality of bridges 390, respectively.

The ends of the insertion protrusions 409 of the plurality of bridges 390 are in contact with the ends of the coupling protrusions 291 of the stator core 281, respectively.

Both side surfaces of the insertion protrusion 409 are in contact with an inner surface of a pair of legs 275 with the slit 277 interposed therebetween.

This may allow the plurality of legs 275 and the plurality of bridges 390 to be securely coupled to each other.

As illustrated in FIGS. 11 and 12, an adhesive 407 may be provided between the leg contact portions 405 of the bridges 390 and the plurality of legs 275.

The adhesive 407 may be applied to at least one of mutual contact surfaces of the leg 275 and the leg contact portion 405 of each of the bridges 390 prior to coupling the inner housing 260 and the bracket 380 to each other.

With this configuration, the first bearing 360a is accommodatingly coupled to the inside of the inner housing 260, and the coupling protrusions 291 are disposed to correspond to the slits 277 of the inner housing 260, respectively. Then, when the stator 280 is pressed in the axial direction, the stator 280 is accommodatingly coupled to the inside of the inner housing 260.

The rotor 340 is accommodatingly coupled to an inside of the stator 280, and the bracket 380 is disposed at the end of the stator 280. Here, the second bearing 360b may be accommodatingly coupled to an inside of the bearing accommodation portion 381 of the bracket 380.

The plurality of bridges 390 is disposed to correspond to the plurality of legs 275, respectively, and the ends of the insertion protrusions 409 of the plurality of bridges 390 are disposed at the entrances of the slits 277 of the plurality of legs 275, respectively. Then, when the bracket 380 is pressed in the axial direction, the insertion protrusions 409 are inserted into the respective slits 277.

Here, before coupling the inner housing 260 and the bracket 380 to each other, the adhesive 407 is applied to at least one of mutual contact surfaces of the plurality of leg 275 and the plurality of bridges 390.

When a predetermined time has elapsed after coupling the bracket 380 to the inner housing 260, the adhesive 407 is cured, and the plurality of legs 275 and the brackets 380 of the inner housing 260 are integrally fixed and coupled, respectively, realizing the electric motor assembly 200.

The electric motor assembly 200 may be accommodated in the handle 150 so as to be fixedly coupled to the handle 150, as illustrated in FIG. 1.

In some implementations, when drying or styling hair with the hair dryer, a user may adjust or change a rotational speed of the electric motor assembly 200 and a heating temperature of the electric heater 140 through the signal input portion while holding the handle 150.

In the electric motor assembly 200, the outer housing 251 has a size of 20.0 mm or less, enabling an outer diameter of the handle 150 of the hair dryer to be relatively thin. Accordingly, even a user with a small hand may easily grip the handle 150, allowing the user to conveniently use the hair dryer.

When power is applied to the electric motor assembly 200 as operation is started, a magnetic field formed by the stator 280 and a magnetic field formed by the rotor 340 interact with each other, causing the rotor 340 and the impeller 210 to be rotated with respect to the rotating shaft 341.

Here, the rotor 340 is supported by the first bearing 360a and the second bearing 360b disposed on both sides of the rotor 340, allowing lateral displacement and vibration to be suppressed. As a result, the air gap G between the stator 280 and the rotor 340 may be securely maintained, and a decrease in output of the electric motor assembly 200 due to non-uniformity of the air gap G may be suppressed.

When the impeller 210 starts to rotate, external air may be introduced into the outer housing 251 through the inflow end of the outer housing 251.

The air that has passed through the impeller 210 flows along the air flow path between the outer housing 251 and the inner housing 260.

The air that has passed through the electric motor assembly 200 is introduced into the hair dryer body 100, heated by the electric heater 140, then discharged through the air outlet port 135.

Here, room-temperature air discharged through the penetrating portion 125 of the hair dryer body 100 is joined from an inner side of heated air discharged through the air outlet port 135.

In addition, room-temperature air at an outside of the air outlet port 135 of the hair dryer body 100 is joined from an outer side of the heated air discharged through the air outlet port 135.

Hereinafter, various implementations of the inner housing of the electric motor assembly will be described with reference to FIGS. 13 to 16.

FIGS. 13 to 16 respectively illustrate examples of a leg of the inner housing of FIG. 3. As illustrated in FIGS. 13 to 16, a plurality of legs 275a, 275b, 275c, and 275d are provided with side portions 276a, 276b, 276c, and 276d, respectively, each having a cross-sectional shape that gradually decreases in width from the end of the inner housing 260.

Figure 13:
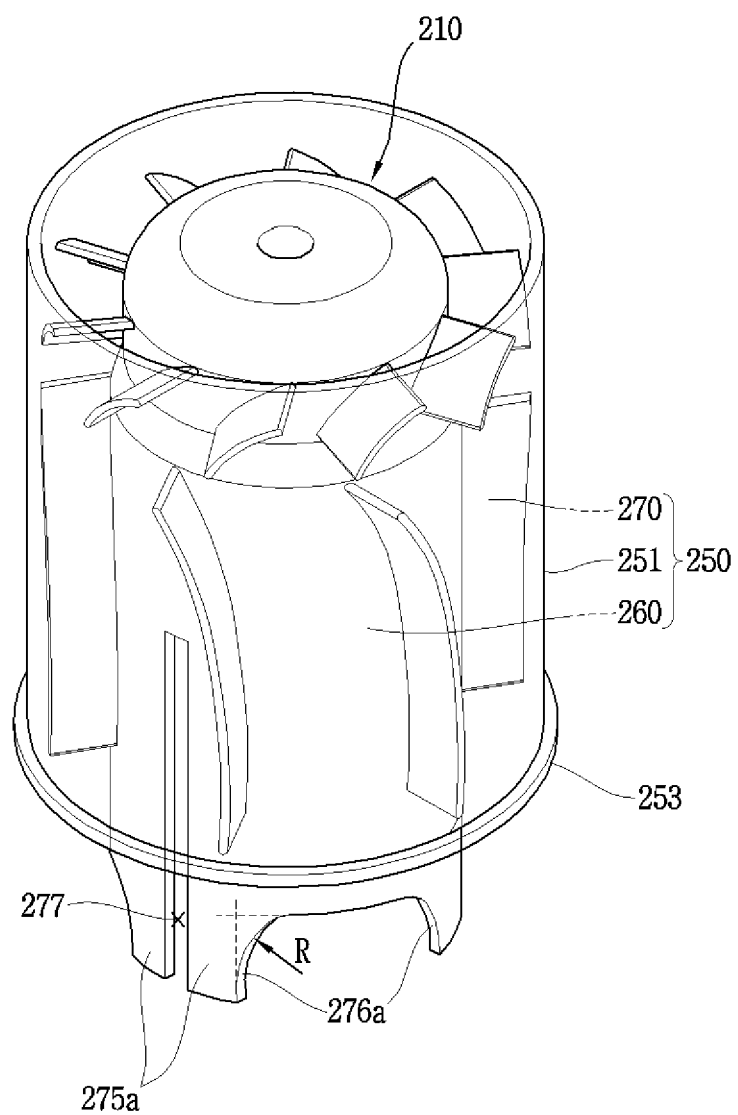
FIGS. 13 to 16 respectively illustrate examples of a leg of the inner housing of FIG. 3.

As illustrated in FIG. 13, each side portion 276a of the plurality of legs 275a may have, for example, an end (outflow end) of the inner housing 260 and an arcuate shape with a radius of curvature R of a predetermined size.

Accordingly, strength that supports an end of the plurality of legs 275a is increased, thereby preventing transverse deformation of an end region of the plurality of legs 275a.

Figure 14:
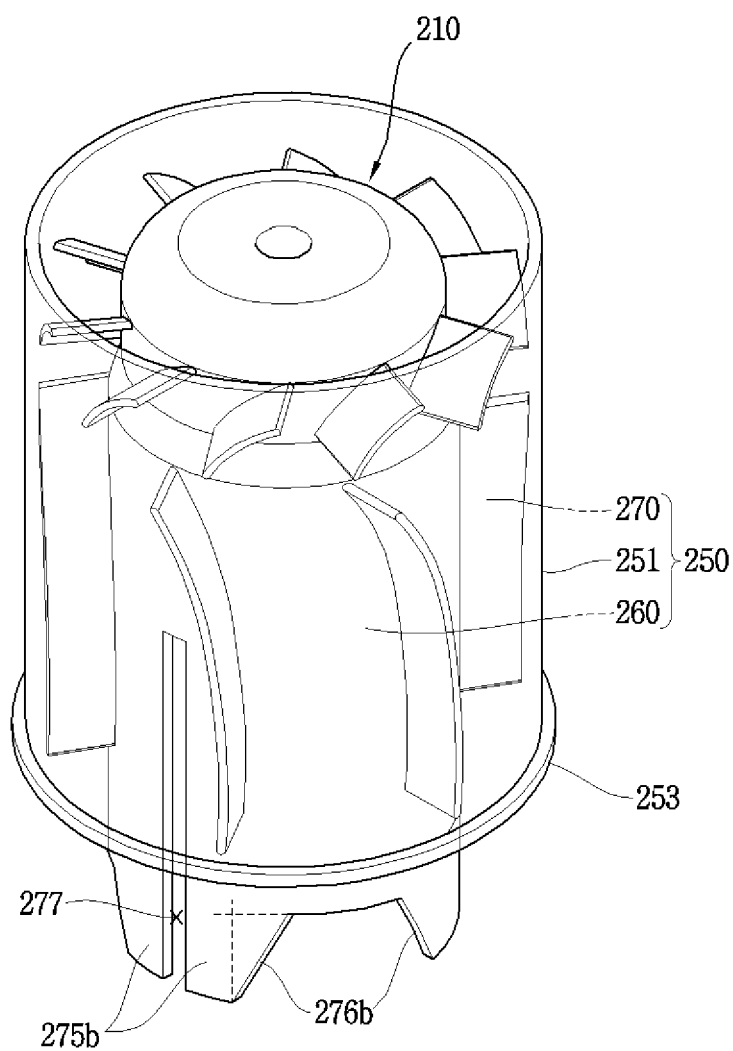

In some implementations, as illustrated in FIG. 14, each side portion 276b of the plurality of legs 275b may extend to be tilted outward from an end of the plurality of legs 275b toward the outflow end of the inner housing 260.

Figure 15:
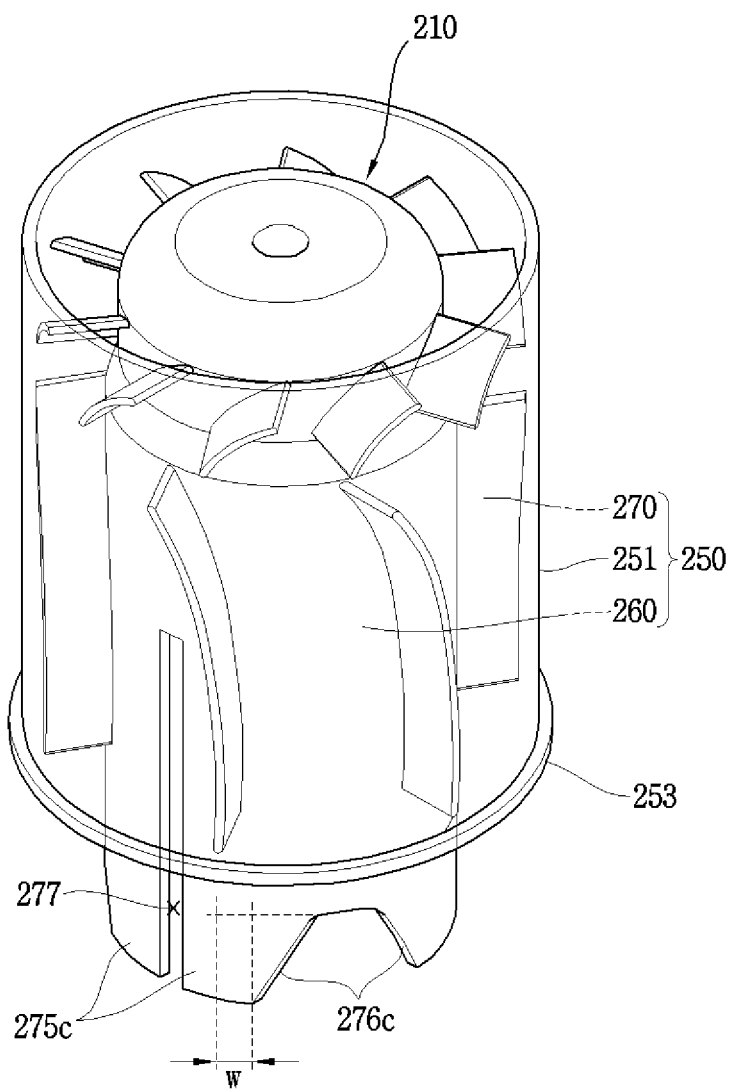

In some implementations, as illustrated in FIG. 15, each side portion 276c of the plurality of legs 275c may be configured such that a width of an end of the plurality of legs 275c extends by a predetermined width w along the circumferential direction and extends to be tilted outward toward the outflow end of the inner housing 260.

Figure 16:
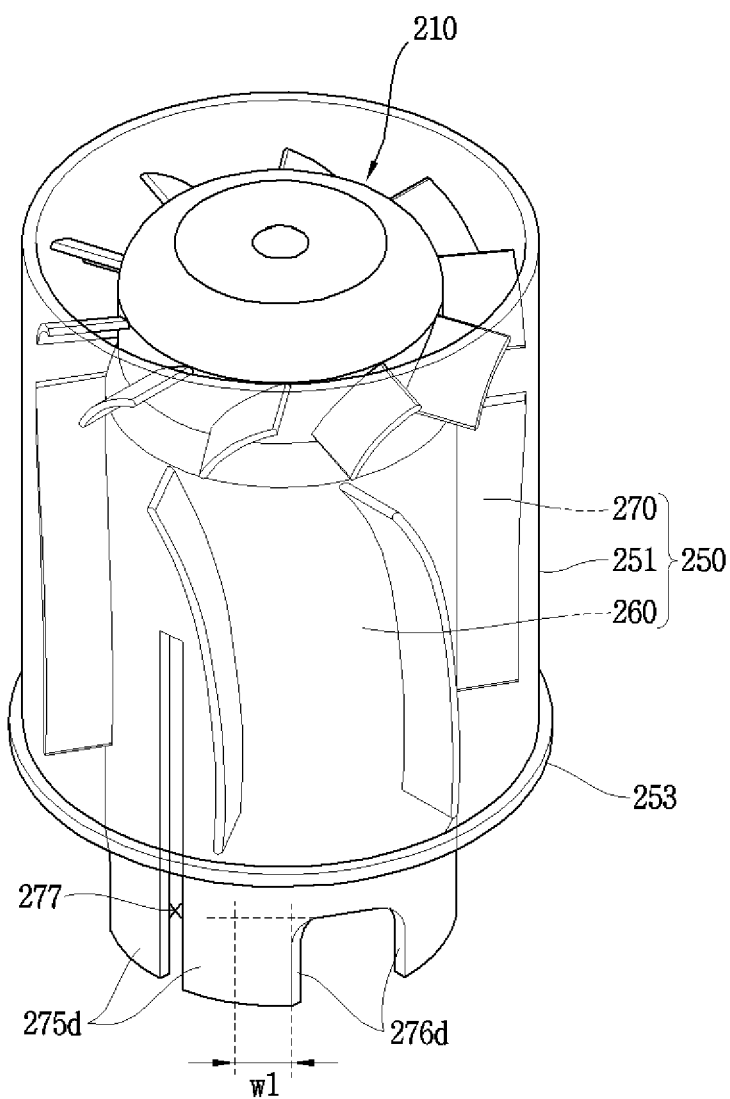

In some implementations, as shown in FIG. 16, each side portion 276d of the plurality of legs 275d may be configured such that a width of an end of the plurality of legs 275d extends by a predetermined width w1 along the circumferential direction and extends parallel to the axial direction toward the outflow end of the inner housing 260.

With this configuration, strength that supports the plurality of legs 275a, 275b, 275c, and 275d is increased. As a result, lateral displacement (deformation) of the plurality of legs 275a, 275b, 275c, and 275d may be suppressed, enabling more secure coupling between each leg and the bracket 380.

As the second bearing 360b is securely held at its initial position by the bracket 380, the air gap G between the stator 280 and the rotor 340 may be uniformly maintained.

Thus, a decrease in output of the electric motor assembly 200 caused by non-uniformity of the air gap G between the stator 280 and the rotor 340 may be suppressed.

Further, vibration of the rotor 340 and noise generated by the vibration are suppressed or reduced, thereby enabling quiet operation.

Hereinafter, an electric motor will be described with reference to FIGS. 17 to 20.

Figure 17:
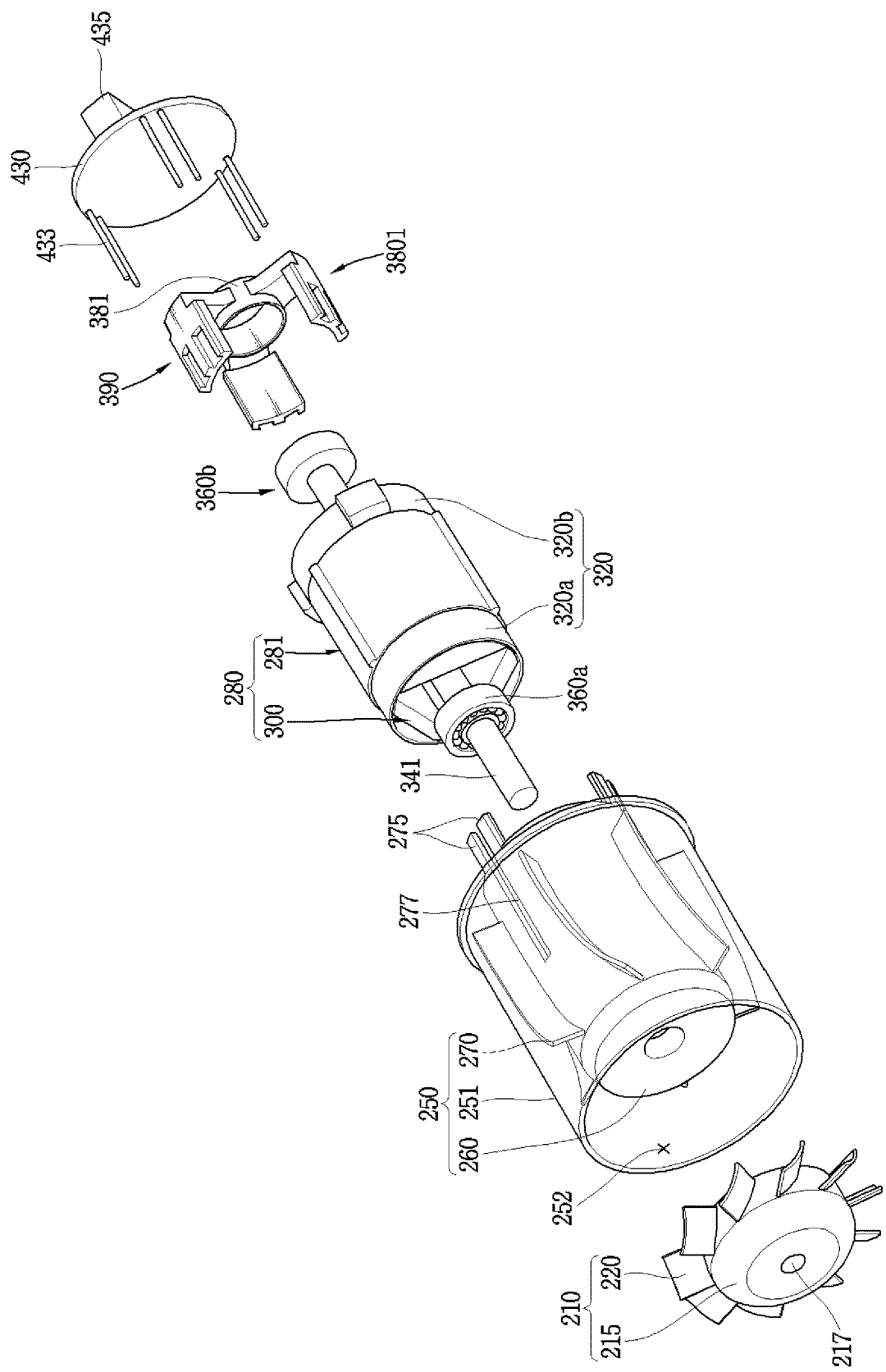
FIG. 17 is an exploded perspective view showing an example of an electric motor.
Figure 18:
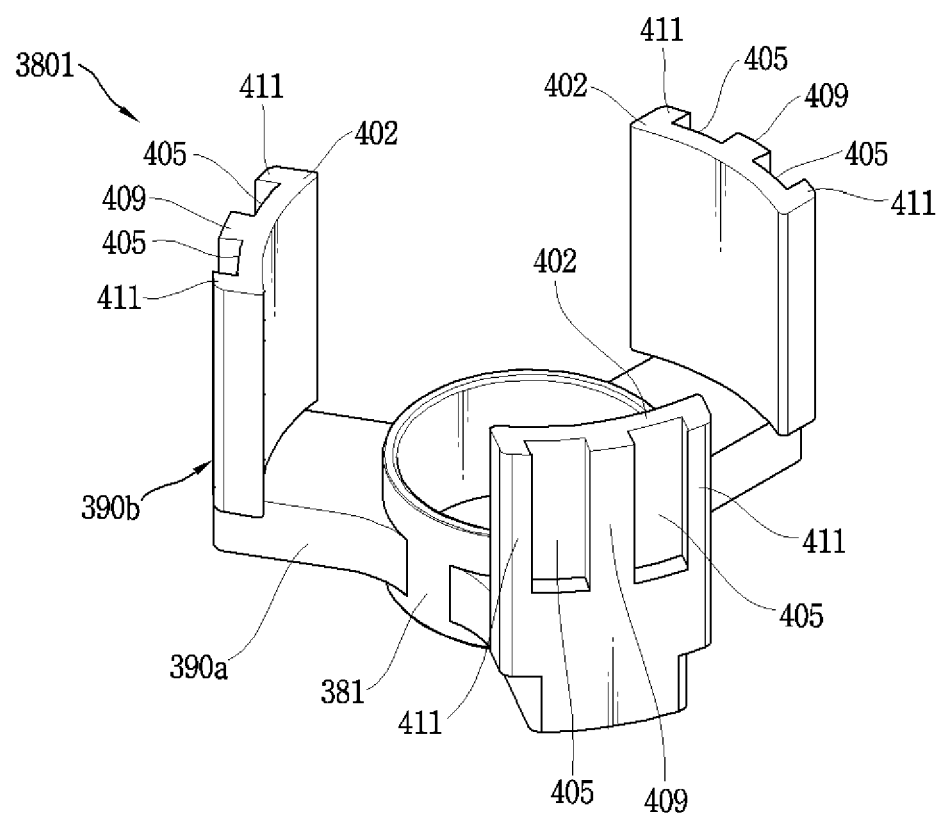
FIG. 18 is an enlarged perspective showing an example of a bracket of FIG. 17.
Figure 19:
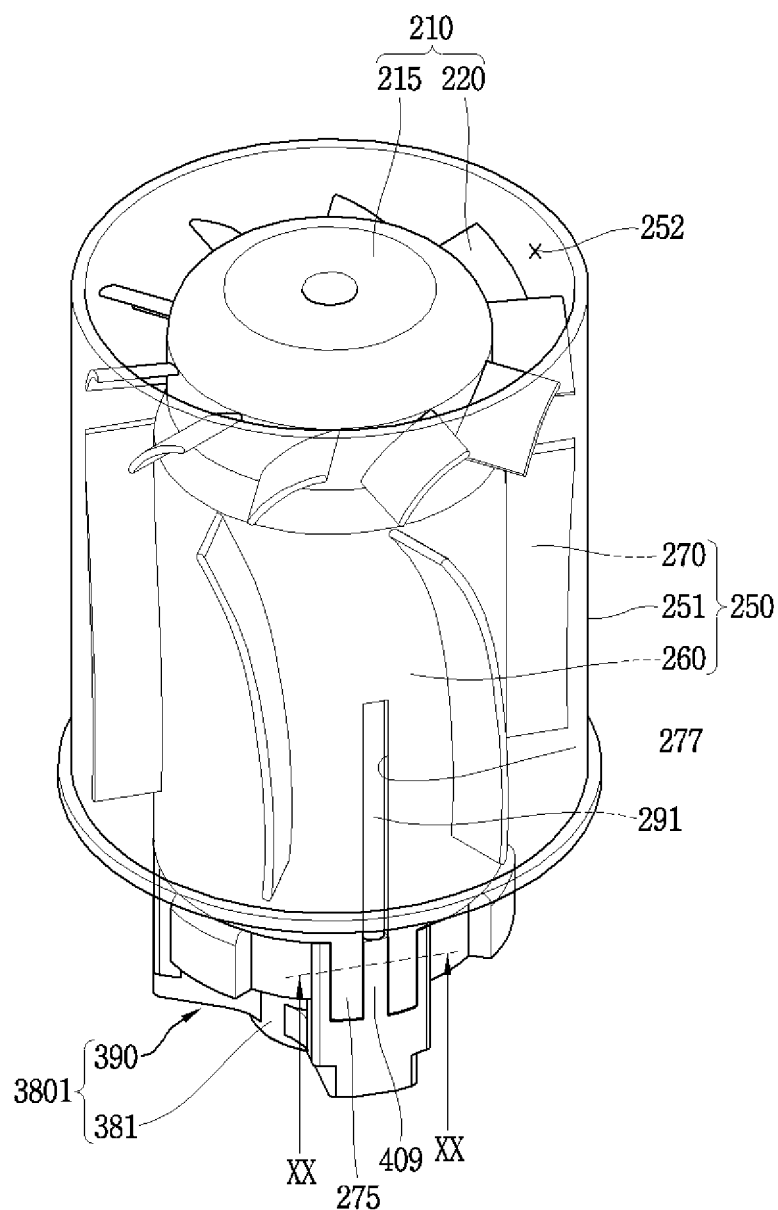
FIG. 19 is a perspective view illustrating an example of a coupled state between the inner housing, the stator core, and the bracket of FIG. 17.
Figure 20:
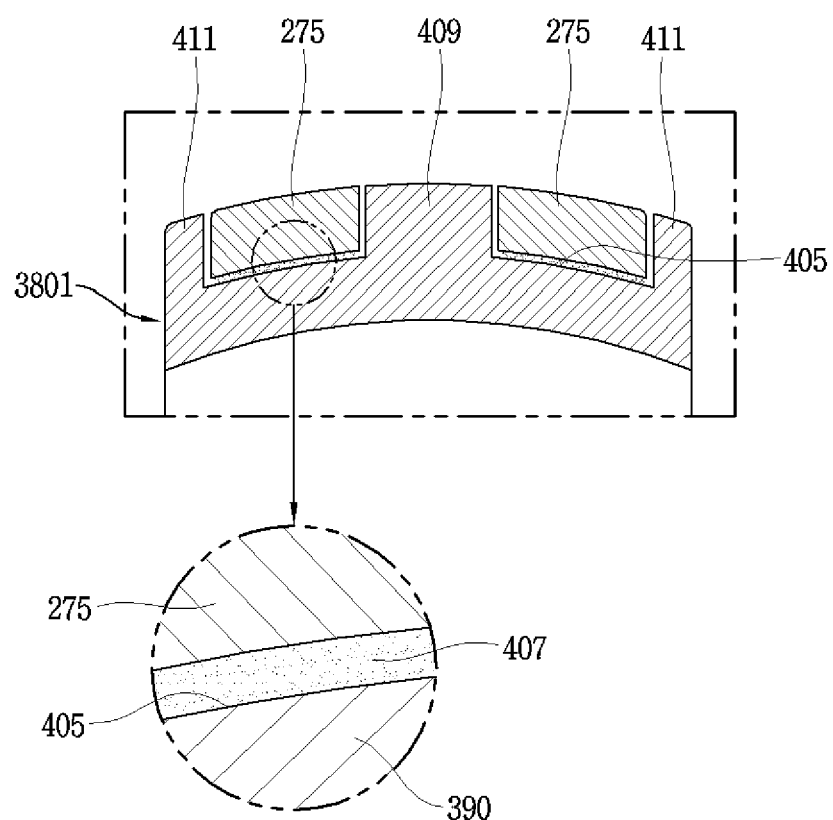
FIG. 20 is a horizontal cross-sectional view showing a leg region of FIG. 19.

FIG. 17 is an exploded perspective view showing an example of an electric motor, FIG. 18 is an enlarged perspective view showing an example of a bracket of FIG. 17, and FIG. 19 is a perspective view illustrating an example of a coupled state between the inner housing, the stator core, and the bracket of FIG. 17, and FIG. 20 is a horizontal cross-sectional view showing an example of a leg region of FIG. 19. As illustrated in FIGS. 17 to 20, the electric motor assembly 200 may include the impeller 210, the outer housing 251, the inner housing 260, the stator 280, the rotor 340, the first bearing 360a, the second bearing 360b, and a bracket 3801.

As described above, the impeller 210 includes the hub 215 and the plurality of blades 220 disposed at the circumference of the hub 215.

The impeller accommodation space 252 is formed in one side (left side in the drawing) of the outer housing 251. The inner housing 260 is concentrically disposed on one side (right side in the drawing) of the impeller 210 in the outer housing 251. An air flow path is formed between the outer housing 251 and the inner housing 260. The plurality of vanes 270 is provided between the outer housing 251 and the inner housing 260.

The stator core 281 is inserted into and coupled to the inner housing 260. The plurality of legs 275 is provided at the outflow end of the inner housing 260. In some implementations, the plurality of legs 275 may be configured as three (or three pairs) in number.

The first bearing 360a is disposed at one side of the rotor 340 (left side in the drawing), and the second bearing 360b is disposed at another side thereof. The first bearing 360a is accommodated in the bearing accommodation portion 265 of the inner housing 260. The second bearing 360b is coupled to the bearing accommodation portion 381 of the bracket 3801.

The PCB 430 is provided at one side (right side in the drawing) of the bracket 3801. The PCB 430 is coupled to the insulator 320 of the stator 280.

The stator core 281 may include the plurality of coupling protrusions 291 protruding along the radial direction. The plurality of slits 277 in which the coupling protrusions 291 are accommodated is formed on the inner housing 260. The plurality of slits 277 penetrates through the plurality of legs 275, respectively.

The bracket 3801 includes the bearing accommodation portion 381 in which the second bearing 360b is accommodated, and the plurality of bridges 390 protruding from the bearing accommodation portion 381 and coupled to the plurality of legs 275, respectively.

Each of the plurality of bridges 390 may include the radial section 390a that radially protrudes from the bearing accommodation portion 381 and the axial section 390b that axially extends from the radial section 390a.

At least one leg contact portion 405 that comes in contact with the leg 275 is provided at each of the plurality of bridges.

The leg contact portion 405 and the leg 275 are configured to be in surface contact with each other.

The leg contact portions 405 are formed by cutting outer surfaces of the plurality of bridges 390 along the radial direction.

Each of the plurality of bridges 390 may include the insertion protrusion 409 so as to be inserted into each of the slits 277 of the plurality legs 275.

As illustrated in FIG. 18, each of the plurality of bridges 390 of the bracket 3801 may include side coupling portions 411 coupled to side surfaces of each of the plurality of legs 275.

The side coupling portions 411 are configured to protrude from an outer surface of the leg contact portion 405 of the bridge 390 in the thickness direction.

Accordingly, when coupling the inner housing 260, the stator core 281, and the bracket 3801 to each other, the coupling protrusions 291 of the stator core 281 are disposed to correspond to the slits 277, respectively, and are then pressed in the axial direction to be inserted into the inner housing 260.

Then, the plurality of bridges 390 of the bracket 3801 is disposed to correspond to the plurality of legs 275, respectively, and the ends of the insertion protrusions 409 are disposed at the entrances of the slits 277, respectively. Then, when pressed in the axial direction, the insertion protrusions 409 are inserted into the respective slits 277, as shown in FIG. 19.

As illustrated in FIG. 20, bottom surfaces of the plurality of legs 275 are in contact with the leg contact portions 405 of the bridges 390, respectively.

The side coupling portions 411 are disposed at both sides (outer sides) of each of the plurality of legs 275.

Accordingly, one side (inner side) of each of the plurality of legs 275 is supported by the insertion protrusion 409, and another side (outer side) of each of the plurality of legs 275 is supported by the side coupling portion 411.

Thus, the plurality of legs 275 may not be separated from the respective leg contact portions 405 along the circumferential direction.

Also, its relative movement (generation of a gap or clearance) with respect to the leg contact portion 405 along a circumferential direction of the plurality of legs 275 may be suppressed or reduced.

With this configuration, a coupling force between the plurality of legs 275 and the plurality of bridges 390 may be further increased.

In some implementations, the adhesive 407 may be provided between the plurality of legs 275 and the leg contact portions 405 of the bridges 390.

The adhesive 407 may be applied to at least one surface of mutual contact surfaces between the leg 275 and the leg contact portion 405 prior to coupling the inner housing 260 and the bracket 3801 to each other.

Even when the leg 275 and the leg contact portion 405 are adhesively bonded to each other by the adhesive 407, the side coupling portions 411, together with the insertion protrusion 409, supports the leg 275 from the sides, allowing the leg 275 and the leg contact portion 405 to be securely supported with each other for a longer period of time.

Hereinafter, an electric motor will be described with reference to FIGS. 21 to 26.

Figure 21:
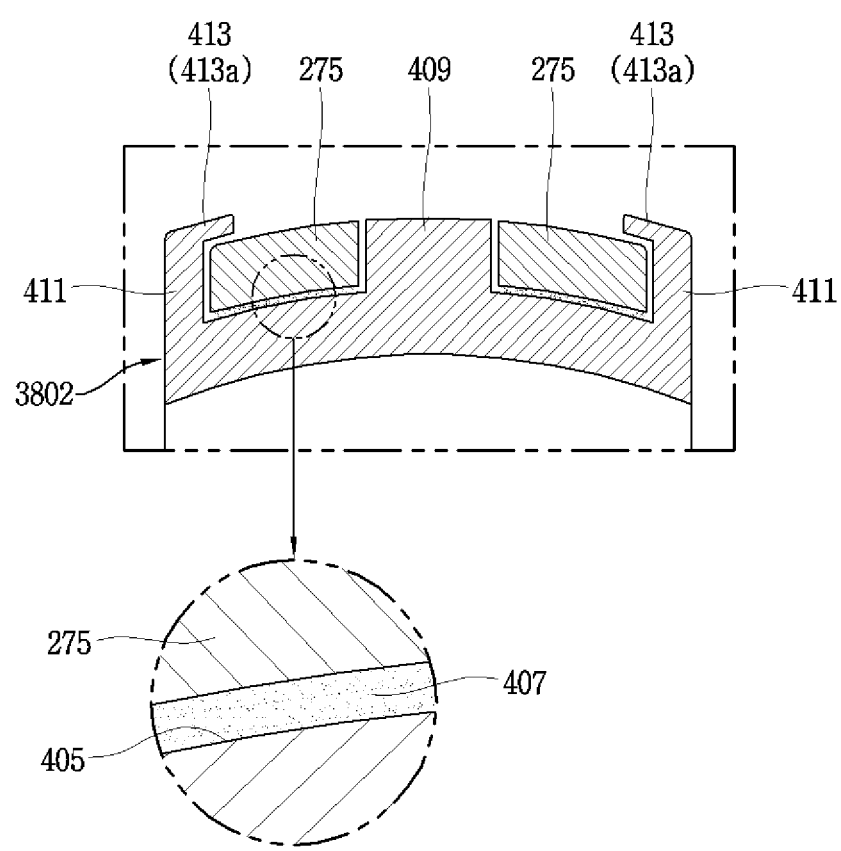
FIG. 21 is a cross-sectional view showing a leg region corresponding to FIG. 19.
Figure 22:
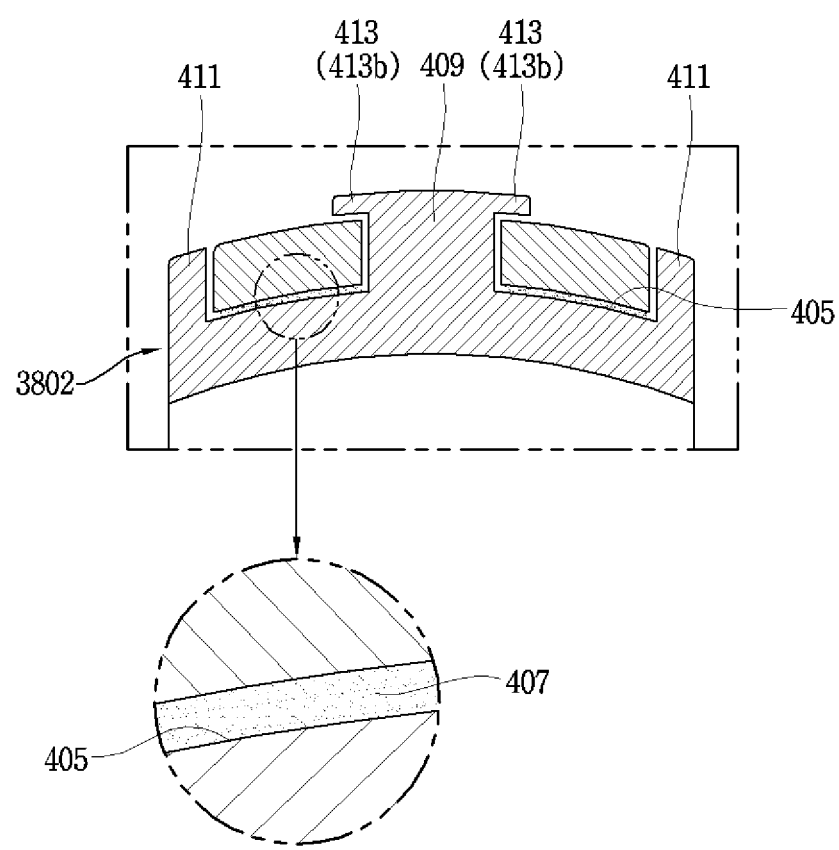
FIG. 22 is a modified example of the bracket of FIG. 21.

FIG. 21 is a cross-sectional view showing an example of a leg region corresponding to FIG. 20, and FIG. 22 illustrates a modified example of the bracket of FIG. 21. As illustrated in FIG. 21, a bracket 3802 of the electric motor assembly includes at least one leg contact portion 405 in contact with the leg 275.

The insertion protrusion 409 inserted into each of the slits 277 of the plurality of legs 275 is formed at each of the leg contact portions 405 in a protruding manner.

The bracket 3802 of the electric motor assembly includes the side coupling portions 411 coupled to both sides of each of the plurality of legs 275.

The side coupling portions 411 protrude outwardly from both sides of the leg contact portion 405 along a thickness direction, for example.

In some implementations, the bracket 3802 of the electric motor assembly may include outer surface coupling portions 413 (413a) coupled to an outer surface of each of the plurality of legs 275.

Accordingly, when the inner housing 260 and the bracket 3802 are coupled to each other, the leg 275 may not be separated from the leg contact portion 405 of the bracket 3802 along a radial direction of the stator core 281.

The outer surface coupling portion 413a may be bent from the side coupling portion 411, for example.

As described above, the adhesive 407 may be applied between the plurality of legs 275 and the leg contact portions 405 of the plurality of bridges 390.

When the leg 275 and the bridge 390 are coupled to each other, the outer surface coupling portions 413a suppress the leg 275 from being separated from the leg contact portion 405. Thus, the leg 275 and the leg contact portion 405 may be firmly adhered to each other without being lifted.

Alternatively, as illustrated in FIG. 22, outer surface coupling portions 413b may horizontally extend from the insertion protrusion 409.

The outer surface coupling portions 413b may protrude from both sides of the insertion protrusion 409, respectively.

In some implementations, the outer surface coupling portions 413 may be configured to have both the outer surface coupling portions 413a provided at an outside of the leg 275 and respectively protruding from the side coupling portions 411, and the outer surface coupling portions 413b formed at an inner side of the leg 275 and protruding from the insertion protrusion 409.

Figure 23:
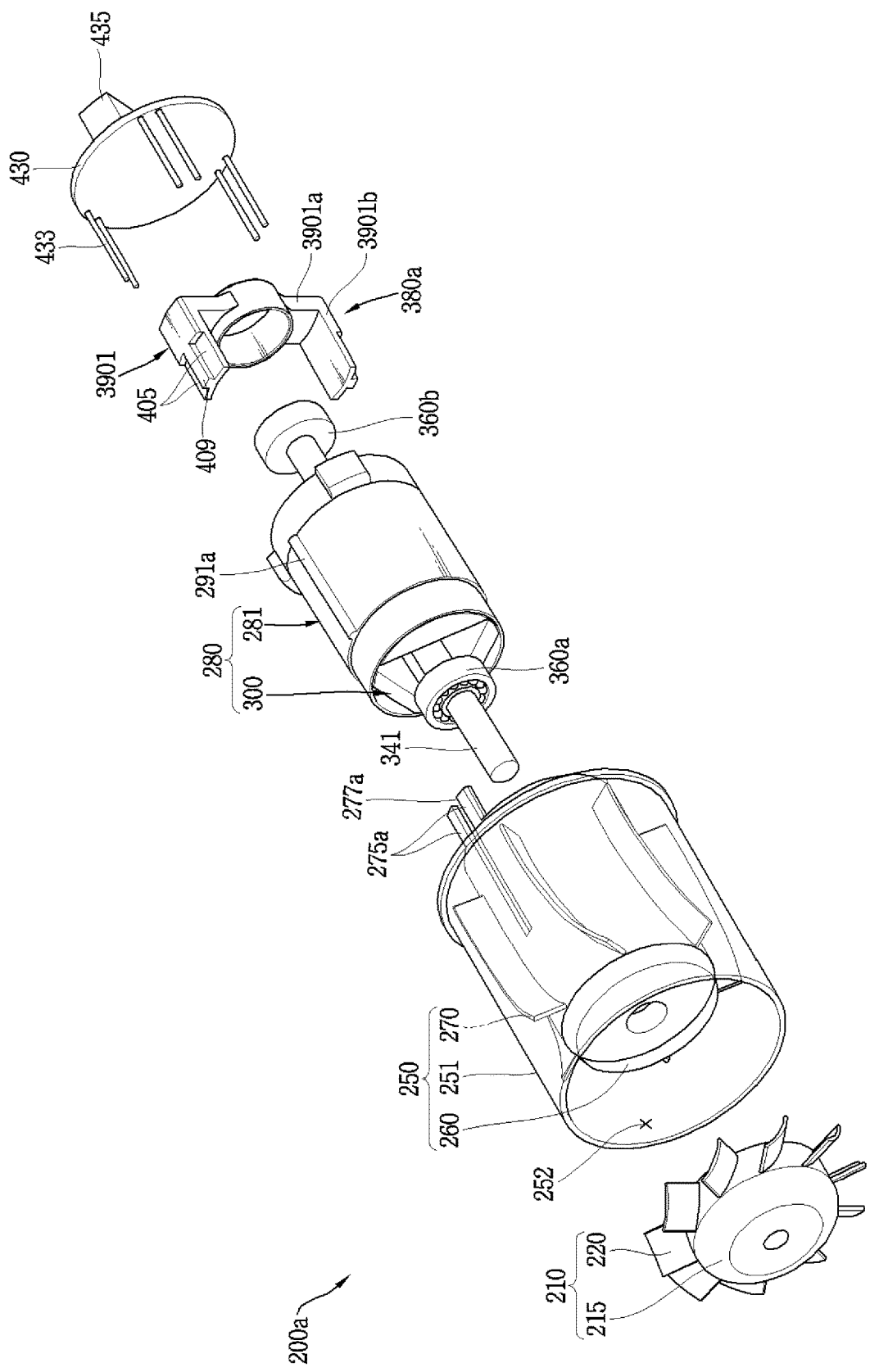
FIG. 23 is an exploded perspective view showing an example of an electric motor assembly.
Figure 24:
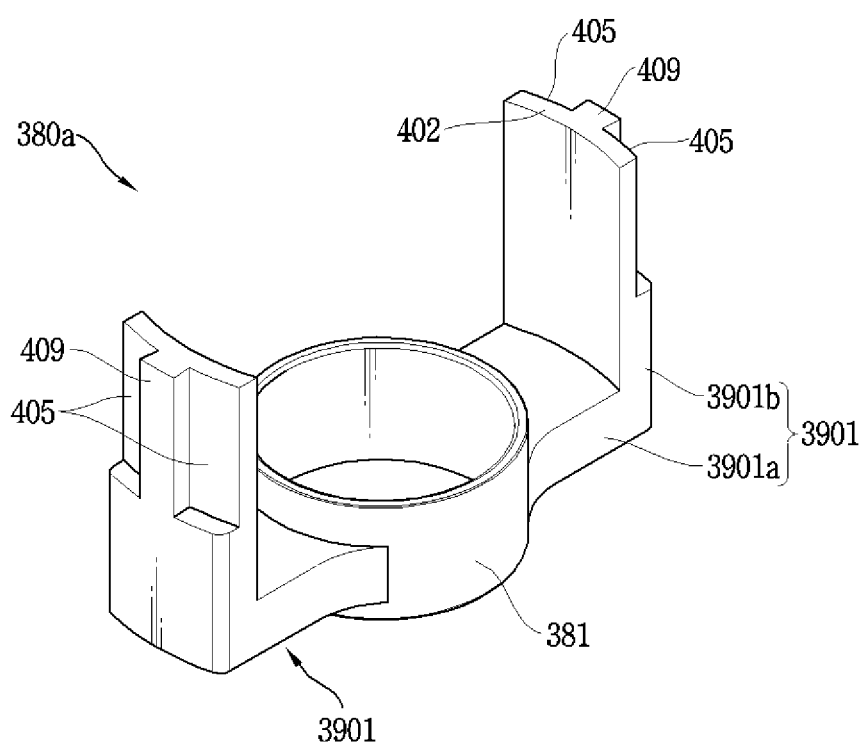
FIG. 24 is an enlarged perspective view showing an example of a bracket of FIG. 23.

FIG. 23 is an exploded perspective view showing an example of an electric motor, and FIG. 24 is an enlarged perspective view showing an example of a bracket of FIG. 23. As illustrated in FIG. 23, the electric motor assembly 200a includes the impeller 210, the housing 250, the stator 280, the rotor 340, the first bearing 360a, the second bearing 360b, and a bracket 380a.

The housing 250 includes the outer housing 251 and the inner housing 260 that are disposed concentrically with each other. The plurality of vanes 270 is provided between the inner housing 260 and the outer housing 251.

The outflow end of the inner housing 260 protrudes at the outflow end of the outer housing 251. A plurality of legs 275a protruding in the axial direction is provided at the outflow end of the inner housing 260.

In some implementations, the plurality of legs 275a of the inner housing 260 is configured as two (or two pairs) in number.

The stator 280 is inserted into the inner housing 260.

The rotor 340 is accommodated in the stator 280 to be rotatable with respect to the rotating shaft 341.

The first bearing 360a is provided at one side of the rotor 340, and the second bearing 360b is provided at another side of the rotor 340. The first bearing 360a is provided in the bearing accommodation portion 265 of the inner housing 260. The second bearing 360b is coupled to the bearing accommodation portion 381 of the bracket 380a.

The stator 280 may include the stator core 281 and the stator coil 300 wound on the stator core 281.

The stator core 281 may be provided therein with the rotor receiving hole 285 and formed by stacking in an insulating manner a plurality of steel plates 283 each having the plurality of slots 287 and the teeth 289 in a circumference of the rotor receiving hole 285.

A plurality of coupling protrusions 291a protruding in the radial direction and extending in the axial direction is provided on the outer surface of the stator core 281. Two coupling protrusions 291a are provided on the outer surface of the stator core 281. The plurality of coupling protrusions 291a of the stator core 281 is disposed to be spaced apart at equal intervals along the circumferential direction of the stator core 281. In some implementations, the two coupling protrusions 291a are 180 degrees apart from each other.

The inner housing 260 may include a plurality of slits 277a in which the plurality of coupling protrusions 291a are accommodated, respectively. The plurality of slits 277a is formed to correspond to the plurality of legs 275a, respectively.

The plurality of legs 275a are divided by the respective slits 277a.

The plurality of slits 277a of the inner housing 260 is two in number.

In some implementations, as illustrated in FIG. 24, the bracket 380a may include the bearing accommodation portion 381 in which the bearing 360 (second bearing 360b) is accommodated and extends in the axial direction from the bearing accommodation portion 381, and a plurality of bridges 3901 axially extending from the bearing accommodation portion 381.

The plurality of bridges 3901 of the bracket 380a is two in number.

In some implementations, the plurality of legs 275a and the plurality of bridges 3901 may have a relatively large cross-sectional area than the plurality of legs 275 configured as three and the plurality of bridges 390 in another implementation, so as to achieve an appropriate coupling force (e.g., the same or similar coupling force of the example described above).

Each of the plurality of bridges 3901 includes a radial section 3901a that radially protrudes from the bearing accommodation portion 381 and an axial section 3901b that is bent from the radial section 3901a and extends in the axial direction.

Inner surfaces of the plurality of bridges 3901 may each have a radius of curvature corresponding to a radius of curvature of an inner diameter of the stator core 281, for example.

The inner surfaces of the plurality of bridges 3901 may have, for example, arcuate cross sections, respectively.

Outer surfaces of the plurality of bridges 3901 may each have, for example, a radius of curvature corresponding to a radius of curvature of an outer diameter of the stator core 281.

The outer surfaces of the plurality of bridges 3901 may have, for example, arcuate cross sections, respectively.

Each of the plurality of bridges 3901 may include the end contact portion 402 in contact with the end of the stator core 281, for example.

The outer surfaces of the plurality of bridges 3901 of the bracket 308a are each configured to have an outer diameter corresponding to the outer surface of the inner housing 260.

Accordingly, an increase in flow resistance that occurs when air flowing in the axial direction by the impeller 210 is brought into contact with the bracket 380a may be suppressed.

Each of the plurality of bridges 3901 of the bracket 380a may include at least one leg contact portion 405 in contact with the leg 275a.

The leg contact portions 405 of the bracket 380*a* are formed by cutting outer surfaces of the plurality of bridges 3901 along a thickness direction, respectively.

Each of the plurality of bridges 3901 may include the insertion protrusion 409 so as to be inserted into each of the slits 261*a* of the plurality of legs 275*a*.

Accordingly, a coupling force between the plurality of legs 275*a* and the plurality of bridges 3901 of the bracket 380*a* may be increased.

Here, the plurality of legs 255*a* and the plurality of bridges 3901 may be adhesively bonded to each other by the adhesive 407, respectively.

Accordingly, when the stator 280 is inserted into the inner housing 260, the coupling protrusions 291*a* are coupled to an inside of the respective slits 277*a*.

The rotor 340 is accommodatingly coupled to the inside of the stator 280, and the impeller 210 is coupled to an end of the rotating shaft 341 that protrudes to an inside of the outer housing 251.

The second bearing 360*b* is coupled to an inside of the bearing accommodation portion 381 of the bracket 380*a*, and the insertion protrusions 409 of the plurality of bridges 3901 of the bracket 380*a* are inserted into the slits 277*a* of the plurality of legs 275*a*, respectively. Here, the plurality of legs 275*a* and the leg contact portions 405 of the plurality of bridges 3901 may be adhesively bonded to each other by the adhesive 407, respectively.

Figure 25:
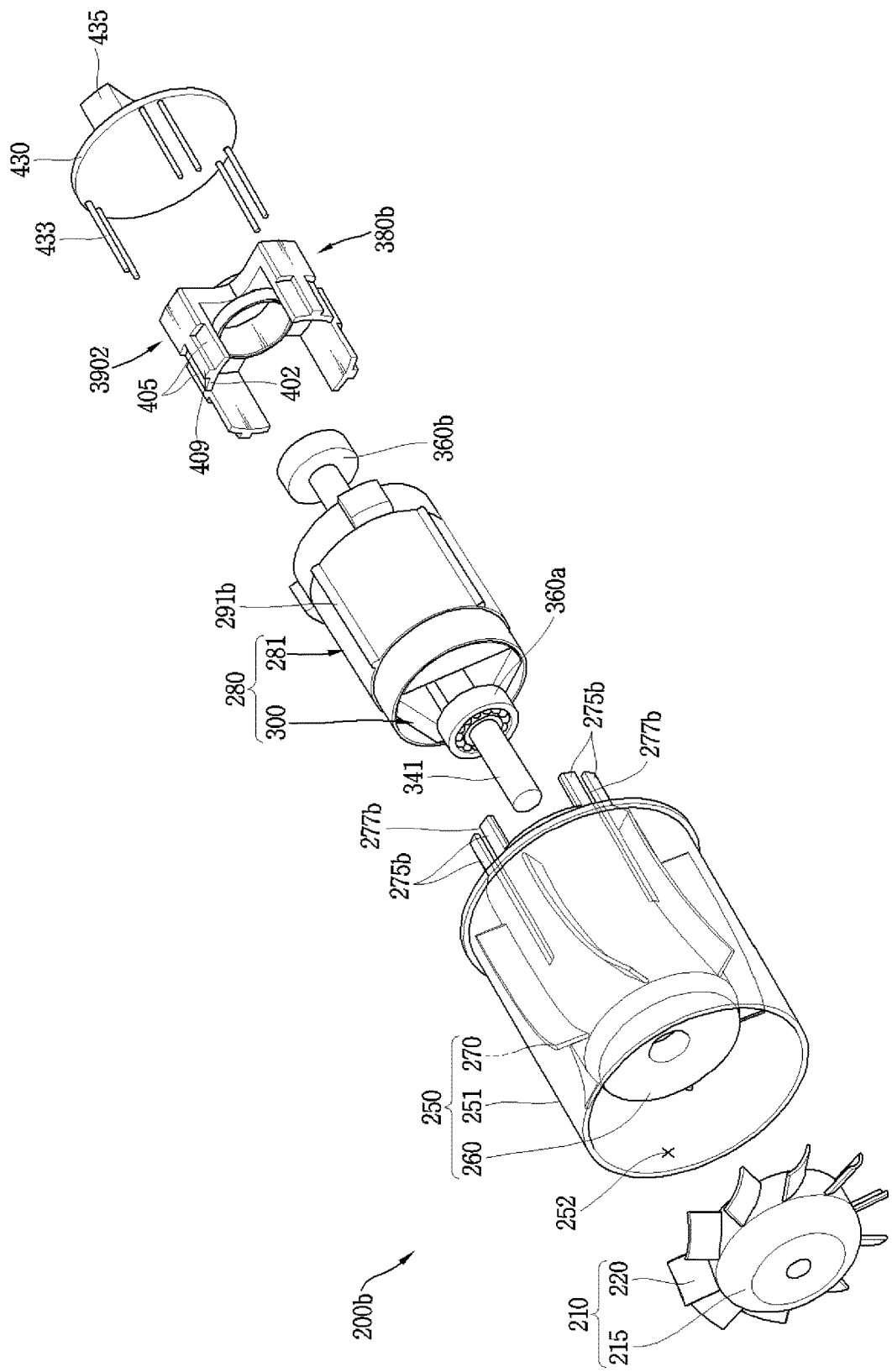
FIG. 25 is an exploded perspective view showing an example of an electric motor assembly.
Figure 26:
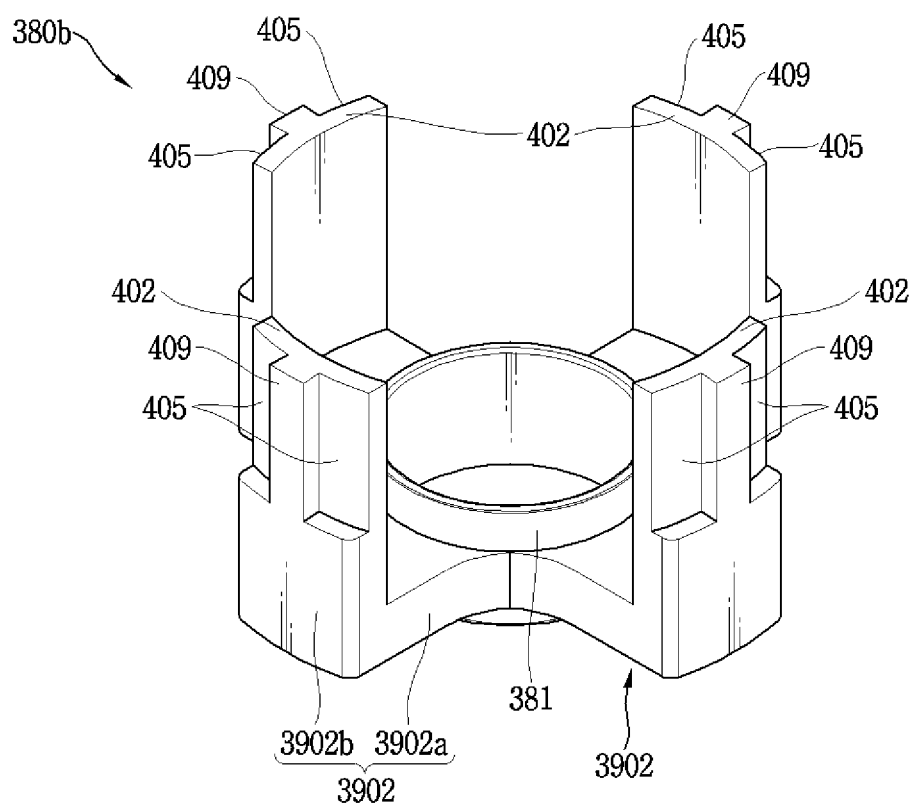
FIG. 26 is an enlarged perspective view showing an example of a bracket of FIG. 25.

FIG. 25 is an exploded perspective view showing an example of an electric motor, and FIG. 26 is an enlarged perspective view showing an example of a bracket of FIG. 25. As illustrated in FIG. 25, an electric motor assembly 200*b* includes the impeller 210, the housing 250, the stator 280, the rotor 340, the first bearing 360*a*, the second bearing 360*b*, and a bracket 380*b*.

The housing 250 includes the outer housing 251 and the inner housing 260 that are disposed concentrically with each other. The plurality of vanes 270 is provided between the inner housing 260 and the outer housing 251.

The outflow end of the inner housing 260 protrudes at the outflow end of the outer housing 251 along the axial direction.

A plurality of legs 275*b* protruding in the axial direction is provided at the outflow end of the inner housing 260.

In some implementations, the plurality of legs 275*b* of the inner housing 260 is configured as four (four pairs) in number.

The stator 280 is inserted into the inner housing 260.

The rotor 340 is rotatably accommodated in the stator 280 so as allow the rotor 340 to be rotatable with respect to the rotating shaft 341.

The first bearing 360*a* is provided at one side of the rotor 340, and the second bearing 360*b* is provided at another side of the rotor 340. The first bearing 360*a* is provided in the bearing accommodation portion 265 of the inner housing 260. The second bearing 360*b* is provided in the bearing accommodation portion 381 of the bracket 380*b*.

The stator 280 may include the stator core 281 and the stator coil 300 wound on the stator core 281. The stator core 281 is provided therein with the rotor receiving hole 285, and formed by stacking in an insulating manner a plurality of electrical steel plates 283 each having the plurality of slots 287 and teeth 289 around the rotor receiving hole 285.

A plurality of coupling protrusions 291*b* protruding along the radial direction and extending in the axial direction is provided on the outer surface of the stator core 281. Four coupling protrusions 291*b* are provided on the outer surface of the stator core 281. The plurality of coupling protrusions 291*b* of the stator core 281 is disposed to be spaced apart at equal intervals along the circumferential direction of the stator core 281. In some implementations, the four coupling protrusions 291*b* are 90 degrees apart from one another.

The inner housing 260 may include a plurality of slits 277*b* in which the plurality of coupling protrusions 291*b* are accommodated, respectively. The plurality of slits 277*b* is formed to correspond to the plurality of legs 275*b*, respectively.

The plurality of legs 275*b* is divided by the respective slits 277*b*.

The plurality of slits 277*b* of the inner housing 260 is four in number.

In some implementations, as illustrated in FIG. 26, the bracket 380*b* may include the bearing accommodation portion 381 in which the bearing 360 (second bearing 360*b*) is accommodated and a plurality of bridges 3902 axially extending from the bearing accommodation portion 381.

The plurality of bridges 3902 of the bracket 380*b* is four in number.

In some implementations, the plurality of legs 275*b* and the plurality of bridges 3902 may have a relatively small cross-sectional area than the plurality of legs 275*a* configured as two and the plurality of legs 275 configured as three of the other examples described above, so as to achieve an appropriate coupling force (e.g., the same or similar coupling force of the examples described above).

Each of the plurality of bridges 3902 includes a radial section 3902*a* that radially protrudes from the bearing accommodation portion 381 and an axial section 3902*b* that is bent from the radial section 3902*a* and extends in the axial direction.

Inner surfaces of the plurality of bridges 3902 may each have a radius of curvature corresponding to a radius of curvature of an inner diameter of the stator core 281.

The inner surfaces of the plurality of bridges 3902 may have, for example, arcuate cross sections, respectively.

Outer surfaces of the plurality of bridges 3902 may each have, for example, a radius of curvature corresponding to a radius of curvature of an outer diameter of the stator core 281.

The outer surfaces of the plurality of bridges 3902 may have, for example, arcuate cross sections, respectively.

Each of the plurality of bridges 3902 may include the end contact portion 402 in contact with the end of the stator core 281, for example.

The outer surfaces of the plurality of bridges 3902 of the bracket 380*b* are each configured to have an outer diameter corresponding to the outer surface of the inner housing 260.

Accordingly, an increase in flow resistance generated when air flowing in the axial direction by the impeller 210 is brought into contact with the bracket 380*b* may be suppressed.

Each of the plurality of bridges 3902 of the bracket 380*b* may include at least one leg contact portion 405 in contact with the leg 275*b*.

The leg contact portions 405 are formed by cutting outer surfaces of the plurality of bridges 3902 along a thickness direction, respectively.

Each of the plurality of bridges 3902 may include the insertion protrusion 409 so as to be inserted into the each of the slits 261*b* of the plurality of legs 275*b*.

This may allow a coupling force between the plurality of legs 275*b* and the plurality of bridges 3902 of the bracket 380*b* to be increased.

The plurality of legs 275b and the plurality of bridges 3902 may be adhesively bonded to each other by the adhesive 407, respectively.

When the stator 280 is inserted into the inner housing 260, the coupling protrusions 291b are coupled to an inside of the respective slits 277b.

The rotor 340 is accommodatingly coupled to the inside of the stator 280, and the impeller 210 is coupled to the end of the rotating shaft 341 that protrudes to the inside of the outer housing 251.

The second bearing 360b is coupled to an inside of the bearing accommodation portion 381 of the bracket 380b, and the insertion protrusions 409 of the plurality of bridges 3902 of the bracket 380b are inserted into the slits 277b of the plurality legs 275b, respectively.

Here, the plurality of legs 275b and the leg contact portions 405 of the plurality of bridges 3902 may be adhesively bonded to each other by the adhesive 407, respectively.

In the foregoing, exemplary implementations of the present disclosure have been shown and described. However, the present disclosure may be implemented in various forms without departing from the spirit or essential characteristics thereof, and accordingly, it is intended that the implementations described above are not be limited by the detailed description provided herein.

Moreover, even if any implementation is not specifically disclosed in the foregoing detailed description, it should be broadly construed within the scope of the technical spirit, as defined in the accompanying claims. Furthermore, all modifications and variations included within the technical scope of the claims and their equivalents should be covered by the accompanying claims.

What is claimed is:

1. An electric motor assembly, comprising:
   an outer housing;
   an impeller rotatably disposed in the outer housing;
   an inner housing that is disposed in the outer housing and defines an air flow path at an outside of the inner housing;
   a stator disposed in the inner housing;
   a rotor disposed in the inner housing, the rotor comprising a rotating shaft coupled to the impeller;
   a first bearing that is disposed in the inner housing and supports a first side of the rotating shaft;
   a second bearing that disposed in the inner housing and supports a second side of the rotating shaft, wherein the rotor is disposed between the first bearing and the second bearing; and
   a bracket that is disposed at the second bearing and that is in contact with an end of the stator, the bracket being coupled to the inner housing in an axial direction of the inner housing,
   wherein the stator comprises:
      a stator core, the stator core comprising a plurality of coupling protrusions that protrude from an outer surface of the stator core in a radial direction and extend in the axial direction, and
      a stator coil that is wound around at least a portion of the stator core, and
   wherein the inner housing defines a plurality of slits, each of the plurality of slits receiving one of the plurality of coupling protrusions.

2. The electric motor assembly of claim 1, wherein the inner housing comprises:
   an inner housing body having a cylindrical shape; and
   a plurality of legs that protrude from the inner housing body and are coupled to the bracket.

3. The electric motor assembly of claim 2, wherein the bracket comprises:
   a bearing accommodation portion that receives the second bearing; and
   a plurality of bridges that extend from the bearing accommodation portion toward the stator.

4. The electric motor assembly of claim 3, wherein each of the plurality of bridges comprises a leg contact portion that is in contact with one of the plurality of legs.

5. The electric motor assembly of claim 4, wherein the leg contact portion is recessed from an outer surface of one of the plurality of bridges in a thickness direction.

6. The electric motor assembly of claim 3, wherein each of the plurality of slits extends through one of the plurality of legs, and
   wherein each of the plurality of bridges comprises an insertion protrusion that is inserted into one of the plurality of slits.

7. The electric motor assembly of claim 6, wherein each of the plurality of bridges further comprises a side coupling portion coupled to a side surface of one of the plurality of legs.

8. The electric motor assembly of claim 7, wherein each of the plurality of bridges further comprises an outer surface coupling portion coupled to an outer surface of one of the plurality of legs.

9. The electric motor assembly of claim 8, wherein the outer surface coupling portion is bent from the side coupling portion or the insertion protrusion.

10. The electric motor assembly of claim 6, wherein each of the plurality of legs comprises a side portion that extends from an end of the inner housing, and
    wherein a circumferential width of the side portion decreases in a direction away from the end of the inner housing.

11. The electric motor assembly of claim 10, wherein the circumferential width of the side portion is greater than a circumferential width of one of the plurality of bridges.

12. The electric motor assembly of claim 11, wherein the side portion has a curved shape or a linear shape that is inclined with respect to the axial direction.

13. The electric motor assembly of claim 1, wherein the stator further comprises an insulator made of an insulation material and disposed between the stator core and the stator coil, and
    wherein the insulator comprises an end turn insulation portion that protrudes toward the impeller relative to an end of the stator core and that is disposed at a position corresponding to an end turn portion of the stator coil.

14. The electric motor assembly of claim 13, further comprising a printed circuit board (PCB) disposed at one side of the bracket and electrically connected to the stator coil.

15. The electric motor assembly of claim 14, wherein the PCB comprises a plurality of connection pins that are electrically connected to the stator coil.

16. The electric motor assembly of claim 4, wherein the plurality of bridges are bonded to the plurality of legs by an adhesive.

17. The electric motor assembly of claim 3, wherein each of the plurality of bridges has an end contact portion that is in surface contact with the end of the stator.

18. The electric motor assembly of claim 1, wherein the inner housing has an upstream end located adjacent to the impeller, and a downstream end located away from the impeller, and wherein the downstream end of the inner housing protrudes outward relative to an end of the outer housing in a flowing direction of air moved by the impeller.

19. A hair dryer comprising:
an electric motor assembly comprising:
an outer housing,
an impeller rotatably disposed in the outer housing,
an inner housing that is disposed in the outer housing and defines an air flow path at an outside of the inner housing,
a stator disposed in the inner housing,
a rotor disposed in the inner housing, the rotor comprising a rotating shaft coupled to the impeller,
a first bearing that is disposed in the inner housing and supports a first side of the rotating shaft,
a second bearing that disposed in the inner housing and supports a second side of the rotating shaft, wherein the rotor is disposed between the first bearing and the second bearing, and
a bracket that is disposed at the second bearing and that is in contact with an end of the stator, the bracket being coupled to the inner housing in an axial direction of the inner housing;
a hair dryer body that defines an air outlet port; and
a handle that is connected to the hair dryer body and accommodates the electric motor assembly, the handle defining an air inlet port configured to communicate with the air outlet port.

20. An electric motor assembly, comprising:
an outer housing;
an impeller rotatably disposed in the outer housing;
an inner housing that is disposed in the outer housing and defines an air flow path at an outside of the inner housing;
a stator disposed in the inner housing;
a rotor disposed in the inner housing, the rotor comprising a rotating shaft coupled to the impeller;
a first bearing that is disposed in the inner housing and supports a first side of the rotating shaft;
a second bearing that disposed in the inner housing and supports a second side of the rotating shaft, wherein the rotor is disposed between the first bearing and the second bearing; and
a bracket that is disposed at the second bearing and that is in contact with an end of the stator, the bracket being coupled to the inner housing in an axial direction of the inner housing,
wherein the inner housing comprises:
an inner housing body having a cylindrical shape, and
a plurality of legs that protrude from the inner housing body and are coupled to the bracket,
wherein the bracket comprises:
a bearing accommodation portion that receives the second bearing, and
a plurality of bridges that extend from the bearing accommodation portion toward the stator, and
wherein the plurality of bridges are bonded to the plurality of legs by an adhesive.

* * * * *